US007315817B2

(12) United States Patent
Tasaki

(10) Patent No.: US 7,315,817 B2
(45) Date of Patent: Jan. 1, 2008

(54) SOUND ENCODER AND SOUND DECODER

(75) Inventor: Hirohisa Tasaki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 814 days.

(21) Appl. No.: 10/192,563

(22) Filed: Jul. 11, 2002

(65) Prior Publication Data

US 2003/0019348 A1 Jan. 30, 2003

(30) Foreign Application Priority Data

Jul. 25, 2001 (JP) ............................ 2001-223816

(51) Int. Cl.
*G10L 19/02* (2006.01)
*G10L 21/00* (2006.01)
*H04J 3/16* (2006.01)
*H04B 1/38* (2006.01)

(52) U.S. Cl. ...................... 704/229; 370/465; 704/500; 704/503; 375/219

(58) Field of Classification Search ..................... None
See application file for complete search history.

(56) References Cited

U.S. PATENT DOCUMENTS 5,214,656 A * 5/1993 Chung et al. ............... 714/758
5,436,899 A * 7/1995 Fujino et al. ............... 370/433
5,602,875 A * 2/1997 Mantel et al. .............. 375/264
5,956,674 A * 9/1999 Smyth et al. ............ 704/200.1
6,209,116 B1 * 3/2001 Hammons et al. .......... 714/786
6,311,306 B1 * 10/2001 White et al. ................ 714/790
6,519,279 B1 * 2/2003 Abdesselem et al. ....... 375/219
6,523,147 B1 * 2/2003 Kroeger et al. ............. 714/792
6,628,726 B1 * 9/2003 Breiling ...................... 375/260
2001/0033621 A1 * 10/2001 Khayrallah ................. 375/244
2001/0055318 A1 * 12/2001 Obata et al. ................ 370/474
2002/0039384 A1 * 4/2002 Kato .......................... 375/240

FOREIGN PATENT DOCUMENTS

JP 63-37400 A 2/1988
JP 3-7120 B2 1/1991

(Continued)

OTHER PUBLICATIONS

Calderbank, A.R. "Multilevel Codes for Unequal Error Protection", IEEE transactions on information theory, vol. 39, No. 4, Jul. 1993.*

(Continued)

*Primary Examiner*—Dwayne Bost
*Assistant Examiner*—Matthew J. Sked
(74) *Attorney, Agent, or Firm*—Birch, Stewart, Kolasch & Birch, LLP

(57) ABSTRACT

An sound encoder accepts a sound signal and then produces a plurality of codes which represent the sound signal on a frame-by-frame basis. The sound encoder determines the order in which the plurality of codes is to be multiplexed into a multiplexed code based on one of the plurality of codes on a frame-by-frame basis, multiplexes the plurality of codes one by one into a multiplexed code in the determined order, and acquires an error correction code for the multiplexed code. The sound encoder then outputs the multiplexed code including the acquired error correction code added to the end thereof as a sound code.

16 Claims, 10 Drawing Sheets

FOREIGN PATENT DOCUMENTS

| | | | |
|---|---|---|---|
| JP | 8-44393 | A | 2/1996 |
| JP | 8-33746 | B2 | 3/1996 |
| JP | 9-106299 | | 4/1997 |
| JP | 2000-183751 | A | 6/2000 |
| WO | WO 93/15502 | A1 | 8/1993 |
| WO | WO 99/18673 | A1 | 4/1999 |

OTHER PUBLICATIONS

"3rd Generation Partnership Project; Technical Specification Group GERAN; Channel Coding" 3GPP TS 05.03 V8.6.1, pp. 46-49, (2001).

* cited by examiner

SOUND ENCODER AND SOUND DECODER

BACKGROUND OF THE INVENTION

1. Field of the Invention

The present invention relates to a sound encoder that outputs a sound code produced by compressing a digital sound signal associated with a sound, such as a musical sound or a voice, into a small volume of information, and a sound decoder that decodes the sound code so as to reproduce the sound signal. Particularly, it relates to a sound encoder for, when transmitting a sound code by way of a route onto which bit errors can be piggybacked, multiplexing codes into the sound code so that it contains an error correction code in order to reduce the degree of influence of bit errors, and a sound decoder that pairs up with the sound encoder.

2. Description of Related Art

Most prior art sound encoders produce a plurality of codes having a small volume of information from a sound signal, multiplex them, and produce a sound code which is a combination of the multiplexed codes and an error correction code which is obtained by defining part or all of the multiplexed codes as a target region to be protected. Prior art sound decoders decode the sound code except the error correction code so as to reproduce the sound signal after making an error correction to the target region to be protected by using the error correction code included in the sound code.

FIG. 13 shows the structure of a prior art sound encoder. In the figure, reference numeral 1 denotes a sound signal which is input as a target to be coded to the sound encoder, reference numeral 2 denotes an encoding unit for encoding the sound signal 1 into a plurality of codes and for outputting them, reference numeral 7 denotes an LSP code, reference numeral 8 denotes an adaptive sound source code, reference numeral 9 denotes a driving sound source code, and reference numeral 10 denotes a gain code. The sound signal 1 is encoded into the plurality of codes by the encoding unit 2. Reference numeral 51 denotes a multiplexing unit for multiplexing the plurality of codes produced by the encoding unit 2, reference numeral 12 denotes a multiplexed code into which those codes are multiplexed by the multiplexing unit 51, and reference numeral 5 denotes an error correction coding unit for acquiring an error correction code to be added to the multiplexed code 12, and for outputting a sound code 6.

FIG. 14 shows the structure of a prior art sound decoder. In the figure, reference numeral 6 denotes a sound code, reference numeral 13 denotes an error correction decoding unit for making an error correction to the sound code 6 using an error correction code included in the sound code and for outputting the error-corrected sound code except the error correction code as a multiplexed code 18, reference numeral 52 denotes a demultiplexing unit for demultiplexing the multiplexed code 18 into a plurality of codes, reference numeral 21 denotes an LSP code, reference numeral 22 denotes an adaptive sound source code, reference numeral 23 denotes a driving sound source code, and reference numeral 19 denotes a gain code. The input sound code 6 is demultiplexed into those codes by the demultiplexing unit 52. Reference numeral 16 denotes a decoding unit for decoding the plurality of codes so as to reproduce a sound signal 17.

Hereafter, the operations of the prior art sound encoder and sound decoders will be explained. In the prior art sound encoder, the encoding processing is performed on a frame-by-frame basis, by assuming that each frame of the input sound signal has a predetermined length of, for example, 10 ms. First of all, the sound signal 1 is input to the encoding unit 2. The encoding unit 2 performs a linear prediction analysis on the input sound signal 1 to produce linear prediction coefficients and then converts this linear prediction coefficient into LSP (Line Spectral Pairs) so as to output an LSP code 7 produced by encoding the LSP. The encoding unit 2 produces an adaptive sound source code 8 by encoding an adaptive sound source which corresponds to a pitch-scaled periodic component of a sound source, produces a driving sound source code 9 by encoding a driving sound source which corresponds to a remaining component which is the remainder of the sound source other than the adaptive sound source component, and produces a gain code 10 by encoding gains which provide respective amplitudes for the adaptive sound source and the driving sound source, and then outputs those codes to the multiplexing unit 51.

The multiplexing unit 51 multiplexes the LSP code 7, the adaptive sound source code 8, the driving sound source code 9, and the gain code 10 into a multiplexed code 12 in a predetermined order, and outputs the acquired multiplexed code 12. The error correction coding unit 5 defines a predetermined region included in the multiplexed code 12 as a target region to be protected and produces an error correction code associated with this target region to be protected, and adds the produced error correction code to the end of the multiplexed code, and outputs the acquired code as a sound code 6. A convolutional code, a CRC code, or the like can be used as the error correction code.

The error correction decoding unit 13 demultiplexes the sound code 6 into a multiplexed code and an error correction code by defining a predetermined position of the sound code 6 as a boundary of them, so that part of the sound code 6 prior to the predetermined position is the multiplexed code and the remainder of the sound code 6 posterior to the predetermined position is the error correction code. The error correction decoding unit 13 then makes an error correction using the error correction code by defining a predetermined region included in the multiplexed code as a target region to be protected, and outputs the error-corrected multiplexed code 18. The demultiplexing unit 52 demultiplexes the multiplexed code 18 into an LSP code 21, an adaptive sound source code 22, a driving sound source code 23, and a gain code 19 in the order which has been determined in advance, and outputs the LSP code 21, the adaptive sound source code 22, the driving sound source code 23, and the gain code 19.

The decoding unit 16 decodes the adaptive sound source code 22 so as to produce the adaptive sound source, decodes the driving sound source code 23 so as to produce the driving sound source, decodes the gain code 19 so as to produce the respective gains for the adaptive sound source and the driving sound source, and produces the sound source by multiplying the adaptive sound source and the driving sound source by the respective gains and summing them multiplied by the respective gains. The decoding unit 16 then acquires the LSP by decoding the LSP code 21, converts this LSP into a linear prediction coefficient, and delivers the sound source to a synthesis filter in which the linear prediction coefficient is set as a filter coefficient so as to reproduce a sound signal 17. The decoding unit 16 outputs this sound signal 17.

FIG. 15 is a diagram showing the structure of each of the multiplexed code 12 handled by the prior art sound encoder, and the multiplexed code 18 handled by the prior art sound decoder. Codes, such as an LSP code, an adaptive sound source code, a driving sound source code, and a gain code, which are acquired from a sound signal, have different bit error sensibilities, and bits included in each code have different bit error sensibilities according to their bit positions. The bit error sensibility of each bit is an index for indicating how much the decoded sound signal deteriorates when a bit error occurs in each bit. The error correction encoding unit can effectively make an error correction by using an error correction code having a predetermined number of bits by defining only codes with a high bit sensibility or bits with a high bit sensibility in a specific code as a target region to be protected when performing error correction encoding.

In the case of FIG. 15, all of the gain code 10, a part of the LSP code 7 and a part of the adaptive sound source code 8 having high bit error sensibilities are multiplexed into a first half of the multiplexed code as a target region to be protected. The remainder of the LSP code 7, the remainder of the adaptive sound source code 8 and all of the driving sound source code 9 are placed outside the target region to be protected in the multiplexed code. Because this multiplexing order is determined based on average bit error sensitivities or the like when the multiplexing unit 51 is designed, the multiplexing order does not vary frame to frame and is fixed. In addition, the target region to be protected is also fixed.

Some prior art sound encoders and sound decoders in which multiplexing and the target region to be protected vary from frame to frame adopt a multimode coding method. A prior art sound encoder which adopts a multimode encoding method has two or more types of encoding units, and selects and uses one encoding unit according to results of analysis on the sound signal consisting of target frames to be coded and the state of a transmission path. The prior art sound encoder is provided with a plurality of multiplexing units which pair with the plurality of encoding units, respectively, because the plurality of encoding units output a plurality of codes having different configurations, respectively. The prior art sound encoder thus performs multiplexing by using a corresponding multiplexing unit that pairs with the selected encoding unit, and also multiplexes a mode code indicating which encoding unit has been selected.

A corresponding prior art sound decoder which also adopts the multimode encoding method is provided with a plurality of demultiplexing units and a plurality of decoding units, and uses one demultiplexing unit and one decoding unit specified by the mode code demultiplexed first. Thus, the prior art sound encoder, which adopts the multimode encoding method, further includes one or more encoding units and one or more multiplexing units in addition to the structure shown in FIG. 13, and the prior art sound decoder, which adopts the multimode encoding method, further includes one or more demultiplexing units and one or more decoding units in addition to the structure shown in FIG. 14. In the sound encoder, the order in which a plurality of codes output from an encoding unit are multiplexed and the target region to be protected do not vary from frame to frame and are fixed.

"3rd Generation Partnership Project; Technical Specification Group GERAN; Channel coding (Release 1999)", 3 GPP TS05.03 V8.6.1 (2001-01) discloses another prior art sound encoder and another prior art sound decoder which adopt a multimode encoding method. The prior art sound encoder disclosed in the document has a plurality of encoding units. Each of the plurality of encoding units includes all of the sound encoder as shown in FIG. 13, and the encoding means in each encoding unit provides a bit rate different from that provided by the encoding means of any other encoding unit. Which encoding unit is used is specified by something placed outside the sound encoder. Similarly, the prior art sound decoder disclosed in the above document is provided with a plurality of decoding units. Each of the plurality of decoding units includes all of the sound decoder as shown in FIG. 14, and the decoding means in each decoding unit provides a bit rate different from that provided by the decoding means of any other decoding unit. Which decoding unit is used is specified by something placed outside the sound decoder. In the prior art sound encoder and the prior art sound decoder, the order in which a plurality of codes output from an encoding unit are multiplexed and the target region to be protected do not vary from frame to frame and are fixed.

Japanese patent application publications No. 9-106299 and No. 2000-183751 disclose other prior art sound encoders and other prior art sound decoders. In a prior art sound encoder and a prior art sound decoder disclosed in Japanese patent application publication No. 9-106299, to select only a necessary one from among all samples of the frequency domain coefficient into which the sound signal is converted and to encode the selected sample with a high degree of efficiency, an encoding unit encodes only a predetermined number of partial correlation coefficients which are selected in decreasing order of coefficient value (amplitude). The encoding unit encodes the predetermined number of partial correlation coefficients in decreasing order of coefficient value, and, when encoding a partial correlation coefficient for a second or later time, decodes the immediately-coded partial correlation coefficient, normalizes the next partial correlation coefficient to be coded with the decoded value, and encodes the normalized correlation coefficient. After the sample numbers are converted into binary numbers and the series of sample numbers is Huffman-coded, information on the order in which the plurality of partial correlation coefficients are to be encoded is delivered from the sound encoder to the sound decoder. The prior art sound encoder can have the same structure as shown in FIG. 13 with the exception that the internal structure of the encoding unit 2 is modified, and the prior art sound decoder can have the same structure as shown in FIG. 14 with the exception that the internal structure of the decoding unit 16 is modified.

In a prior art sound encoder and a prior art sound decoder disclosed in Japanese patent application publication No. 2000-183751, to implement variable bit rate encoding synchronized with a traffic (congestions in a transmission path) in real time, bits of data to be coded, bit sensibilities based on data errors, and so on are sorted according to a predetermined standard, under the assumption that agreement about the order in which bits of data to be coded and so on are sorted is made in advance between the encoding side and the decoding side. In other words, the order in which bits of data to be coded and so on are sorted does not vary from frame to frame and is fixed.

A problem with the prior art sound encoder and the prior art sound decoder as shown in FIGS. 13 and 14 is that it is impossible to implement the error protection which reflects a distribution of bit error sensibilities that varies from frame to frame because the order in which a plurality of codes is to be multiplexed into a single code and the target region to be protected do not vary from frame to frame and are fixed, and therefore deterioration in the sound signal due to occurrence of bit errors cannot be sufficiently prevented. Similarly, prior art sound encoders and prior art sound decoders as disclosed in "3rd Generation Partnership Project; Technical Specification Group GERAN; Channel coding (Release 1999)", 3 GPP TS05.03 V8.6.1 (2001-01), in which multimode encoding is adopted, has the same problem because the order output from an encoding unit, in which a plurality of codes is to be multiplexed into a single code, and the target region to be protected do not vary from frame to frame and are fixed.

The prior art sound encoder and the prior art sound decoder disclosed in Japanese patent application publication No. 9-106299, do not sufficiently prevent deterioration in the sound signal due to occurrence of bit errors by adding an error correction code to a single code into which a plurality of codes are multiplexed, but only modify the encoding unit. If anything, deterioration in the sound signal due to the occurrence of bit errors increases because of addition of a code associated with the order in which partial correlation coefficients are to be multiplexed and encoding of a partial correlation coefficient for a second or later time after decoding the immediately-coded partial correlation coefficient and normalizing the next partial correlation coefficient to be coded with the decoded value.

A problem with prior art sound encoder and prior art sound decoders as disclosed in Japanese patent application publication No. 2000-183751 is that it is impossible to implement the error protection which reflects a distribution of bit error sensibilities that varies from frame to frame because the order in which bits of data to be coded and so on are sorted does not vary from frame to frame and is fixed, and therefore deterioration in the sound signal due to occurrence of bit errors cannot be sufficiently prevented.

SUMMARY OF THE INVENTION

The present invention is proposed to solve the above-mentioned problems, and it is therefore an object of the present invention to provide a sound encoder and a sound decoder that can implement error protection which reflects a distribution of bit error sensibilities that varies from frame to frame and that can have immunity to bit errors more than prior art sound encoders and decoders.

In accordance with an aspect of the present invention, there is provided a sound encoder including: an order determination unit for determining and outputting an order in which a plurality of codes produced by an encoding unit are to be multiplexed into a multiplexed code based on one of the plurality of codes on a frame-by-frame basis; a multiplexing unit for multiplexing the plurality of codes one by one into a multiplexed code in the order determined by the order determination unit on a frame-by-frame basis, and for outputting the multiplexed code; and an error correction coding unit for producing an error correction code for the multiplexed code and for outputting the multiplexed code with the error correction code added thereto as a sound code on a frame-by-frame basis.

As a result, the present aspect of the invention makes it possible to implement error protection which reflects a distribution of bit error sensibilities that varies from frame to frame. The present aspect of the invention therefore offers an advantage of being able to provide a sound encoder having immunity to bit errors more than prior art sound encoders.

In accordance with another aspect of the present invention, there is provided a sound encoder including: an order determination unit for providing a plurality of sets of order in which a plurality of codes produced by an encoding unit are to be multiplexed in advance, and for selecting one set of order based on an input sound signal and outputting a multiplexing mode code indicating a number assigned to the selected set of order and the selected set of order on a frame-by-frame basis; a multiplexing unit for defining the multiplexing mode code as an auxiliary code and defining the plurality of codes output from the encoding unit as main codes, and for multiplexing the main codes one by one into a multiplexed code in the order determined by the order determination unit, and further multiplexing the auxiliary code into the multiplexed code and outputting the multiplexed code on a frame-by-frame basis; and an error correction coding unit for producing an error correction code for the multiplexed code and for outputting the multiplexed code with the error correction code added thereto as a sound code on a frame-by-frame basis.

As a result, the sound encoder can adaptively protect all or part of a code with a large influence of bit errors on a frame-by-frame basis and makes it possible to implement error protection which reflects a distribution of bit error sensibilities that varies from frame to frame. Therefore the present aspect of the invention offers an advantage of being able to provide a sound encoder having immunity to bit errors more than prior art sound encoders.

In accordance with a further aspect of the present invention, there is provided a sound decoder including: an error correction decoding unit for making an error correction to an input sound code and for outputting a multiplexed code acquired by removing an error correction code from the error-corrected sound code; an order determination unit for determining an order in which the multiplexed code is to be demultiplexed into a plurality of codes based on the multiplexed code on a frame-by-frame basis, and for outputting the order; a demultiplexing unit for demultiplexing the multiplexed code into a plurality of codes in the order determined by the order determination unit on a frame-by-frame basis, and for outputting the plurality of codes; and a decoding unit for decoding the plurality of codes so as to reproduce and output a sound signal for a musical sound or a voice on a frame-by-frame basis.

As a result, the sound decoder makes it possible to implement error protection which reflects a distribution of bit error sensibilities that varies from frame to frame. Therefore the present aspect of the invention offers an advantage of being able to provide a sound decoder having immunity to bit errors more than prior art sound decoders.

In accordance with another aspect of the present invention, there is provided a sound decoder including: an error correction decoding unit for making an error correction to an input sound code and for outputting a multiplexed code acquired by removing an error correction code from the error-corrected sound code; an order determination unit for providing a plurality of sets of order in which the multiplexed code is to be demultiplexed into a plurality of codes in advance, and for selecting and outputting one set of order according to a multiplexing mode code which is separated from the multiplexed code; a demultiplexing unit for separating the multiplexing mode code as an auxiliary code from the multiplexed code based on the multiplexed code on a frame-by-frame basis, delivering the multiplexing mode code to the order determination unit, demultiplexing the multiplexed code into a plurality of codes as main codes one by one in the order output from the order determination unit on a frame-by-frame basis, and for outputting the plurality of codes; and a decoding unit for decoding the plurality of codes so as to reproduce a sound signal representing a sound, such as a musical sound or a voice, on a frame-by-frame basis, and for outputting the sound signal.

As a result, the sound decoder can adaptively protect all or part of a code with a large influence of bit errors on a frame-by-frame basis and makes it possible to implement error protection which reflects a distribution of bit error sensibilities that varies from frame to frame. Therefore the present aspect of the invention offers an advantage of being able to provide a sound decoder having immunity to bit errors more than prior art sound decoders.

Further objects and advantages of the present invention will be apparent from the following description of the preferred embodiments of the invention as illustrated in the accompanying drawings.

DETAILED DESCRIPTION OF THE PREFERRED EMBODIMENTS

The invention will now be described with reference to the accompanying drawings.

Embodiment 1

Figure 1:
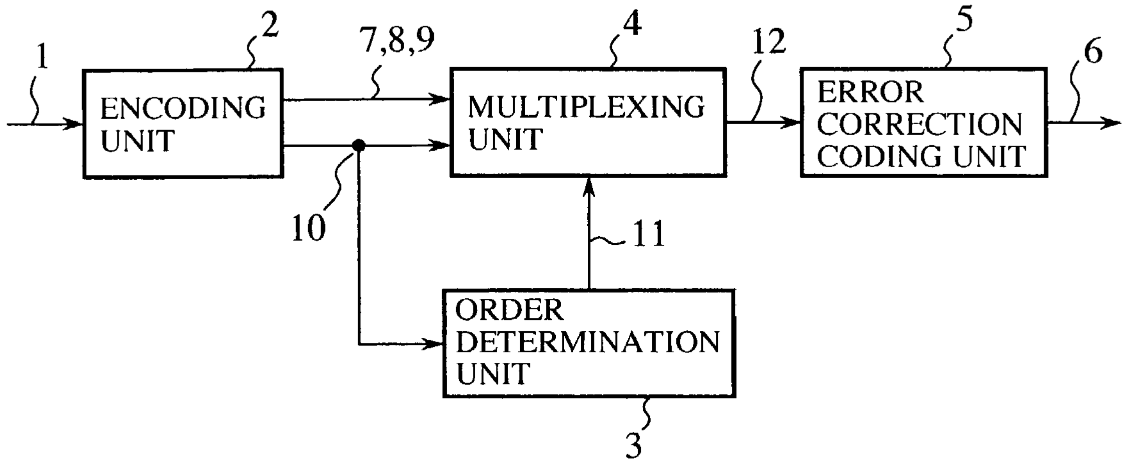
FIG. 1 is a block diagram of a sound encoder according to a first embodiment of the present invention.

FIG. 1 is a block diagram showing the structure of a sound encoder according to a first embodiment of the present invention. In the figure, reference numeral 1 denotes a sound signal input to the sound encoder as a target to be coded, reference numeral 2 denotes an encoding unit for encoding the sound signal 1 so as to produce a plurality of codes and for outputting the plurality of codes, reference numerals 7, 8 and 9 denote an LSP code, an adaptive sound source code, and a driving sound source code, respectively, into which the sound signal 1 is encoded by the encoding unit 2, reference numeral 10 denotes a gain code produced by the encoding unit 2, reference numeral 3 denotes an order determination unit for receiving the gain code 10 and for determining an order 11 in which those codes are to be multiplexed, reference numeral 4 denotes a multiplexing unit for multiplexing the plurality of codes 7 to 10 in the order 11 determined by the order determination unit 3, reference numeral 12 denotes a multiplexed code into which the plurality of codes 7 to 10 are multiplexed by the multiplexing unit 4, reference numeral 5 denotes an error correction coding unit for producing an error correction code for the multiplexed code 12 and for adding it to the multiplexed code 12, and reference numeral 6 denotes a sound code which is the multiplexed code 12 with the error correction code added thereto.

Figure 2:
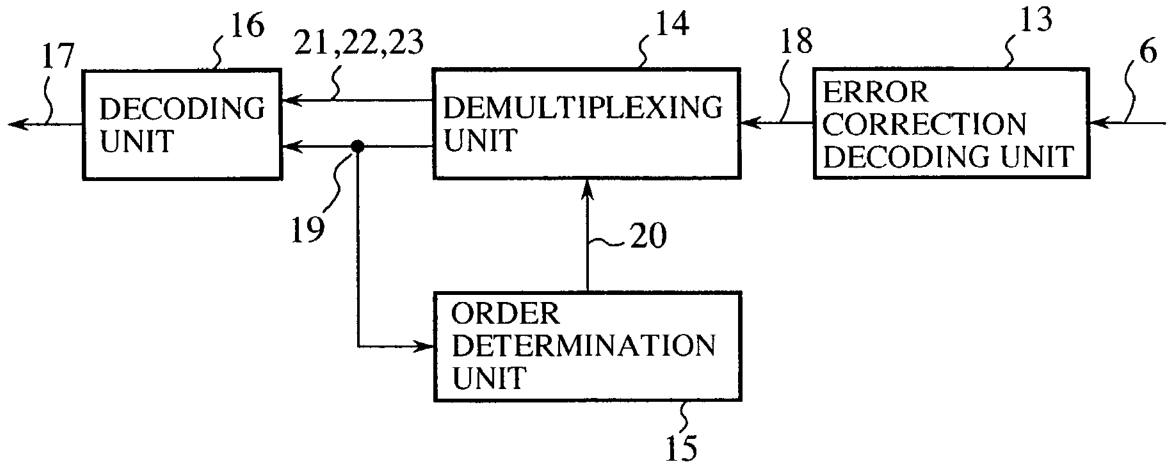
FIG. 2 is a block diagram of a sound decoder according to the first embodiment of the present invention.

FIG. 2 is a block diagram showing the structure of a sound decoder according to the first embodiment of the present invention. In the figure, reference numeral 13 denotes an error correction decoding unit for making an error correction to a sound code 6 applied thereto using an error correction code included in the sound code 6, and for outputting the error-corrected sound code except the error correction code as a multiplexed code 18, reference numeral 14 denotes a demultiplexing unit for demultiplexing the multiplexed code 18 into a plurality of codes in an input order 20 in which the multiplexed code 18 is to be demultiplexed into the plurality of codes, reference numerals 21, 22 and 23 denote an LSP code, an adaptive sound source code, and a driving sound source codes into, respectively, which the multiplexed code 18 is demultiplexed by the demultiplexing unit 14, reference numeral 19 denotes a gain code into which the multiplexed code 18 is also demultiplexed by the demultiplexing unit 14, reference numeral 15 denotes an order determination unit for receiving the gain code 19 and for determining the order 20 in which the multiplexed code 18 is to be demultiplexed by the demultiplexing unit 14, and reference numeral 16 denotes a decoding unit for decoding the plurality of codes so as to reproduce a sound signal 17.

Hereafter, the operations of the sound encoder and the sound decoder of the first embodiment will be explained with reference to FIGS. 1 and 2. In the sound encoder, the encoding processing is performed on a frame-by-frame basis, by assuming that each frame of the input sound signal has a predetermined length of, for example, 10 ms. First of all, a sound signal 1 is input to the encoding unit 2. The encoding unit 2 performs a linear prediction analysis on the sound signal 1 to produce linear prediction coefficients and then converts these linear prediction coefficients into LSP (Line Spectral Pairs) so as to output an LSP code 7 produced by encoding the LSP. The encoding unit 2 produces an adaptive sound source code 8 by encoding an adaptive sound source which corresponds to a pitch-scaled periodic component of a sound source, produces a driving sound source code 9 by encoding a driving sound source which corresponds to a remaining component which is the remainder of the sound source other than the adaptive sound source component, and produces a gain code 10 by encoding gains that provide respective amplitudes-for the adaptive sound source and the driving sound source, respectively, and then outputs those codes to the multiplexing unit 4.

The order determination unit 3 classifies the gain code 10 as an auxiliary code, and classifies the LSP code 7, the adaptive sound source code 8 and the driving sound source code 9 as main codes. The order determination unit 3 receives the gain code 10 which is an auxiliary code, determines the order 11 in which the plurality of codes 7 to 10 are to be multiplexed by the multiplexing unit 4 based on the gain code 10, and outputs the determined order 11. The order 11 does not simply indicate the order in which processes are to be done with time, but indicates where each bit of each of the plurality of codes to be multiplexed into a multiplexed code by the multiplexing unit 4 are to be placed in the multiplexed code.

While the order in which the auxiliary code is to be multiplexed into the multiplexed code does not vary from frame to frame, the order in which the main codes are to be multiplexed into the multiplexed code is determined on a frame-by-frame basis. The order in which the main codes are to be multiplexed into the multiplexed code can be determined according to whether or not the gain acquired for the adaptive sound source, which is obtained by decoding the gain code 10, is equal to or greater than a predetermined threshold, for example. When the gain is calculated as an intermediate variable in the encoding unit 2, it is possible to omit the decoding of the gain code 10 in the order determination unit 3 by delivering the gain from the encoding unit 2 to the order determination unit 3. When the code length of the auxiliary code is short and any information on previous frames is not used for decoding the auxiliary code, the comparison between the decoded result of the auxiliary code and the threshold can be omitted by determining information on the selection of the order for each of all candidates for the auxiliary code with reference to a table which is prepared in advance.

The multiplexing unit 4 accepts the LSP code 7, the adaptive sound source code 8, the driving sound source code 9, the gain code 10, and the order 11, and multiplexes the LSP code 7, the adaptive sound source code 8, the driving sound source code 9, and the gain code 10 into a multiplexed code 12 in the order 11. The multiplexing unit 4 then outputs the acquired multiplexed code 12.

The error correction coding unit 5 defines a predetermined region included in the multiplexed code 12 to be a target region to be protected, acquires an error correction code for this target region to be protected, and adds the acquired error correction code to the end of the multiplexed code. The error correction coding unit 5 then outputs the acquired code as a sound code 6. A convolutional code, a CRC code or the like can be used as the error correction code. Interleave processing can be performed on the sound code 6 immediately before the sound code 6 is output.

Next, the operation of the sound decoder of the first embodiment will be explained. The error correction decoding unit 13 demultiplexes the sound code 6 into a multiplexed code and an error correction code by defining a predetermined position of the sound code 6 as a boundary of them, so that part of the sound code 6 prior to the predetermined position is the multiplexed code and the remainder of the sound code 6 posterior to the predetermined position is the error correction code. The error correction decoding unit 13 then-makes an error correction using the error correction code by defining a predetermined region included in the multiplexed code as a target region to be protected, and outputs the error-corrected multiplexed code 18. When the corresponding error correction coding unit 5 of the sound encoder has performed interleave processing, the error correction decoding unit 13 has to perform deinterleave processing which is the reverse of the interleave processing on the sound code 6 first.

The demultiplexing unit 14 first separates only the auxiliary code, i.e., the gain code 19 from the multiplexed code 18, and outputs the gain code 19. The demultiplexing unit 14 can separate only the auxiliary code without having to wait for inputting of the order determined on a frame-by-frame basis because the order in which the auxiliary code is to be multiplexed into the received multiplexed code is fixed in the order determination unit 3 of the corresponding sound encoder. The order determination unit 15 accepts and decodes the gain code 19 which is an auxiliary code, determines the order 20 in which main codes included in the multiplexed code 18 are demultiplexed by the demultiplexing unit 14 according to a decoded result of the gain code 19, and then outputs the order 20. The method of determining the order has to be made to be the same as that used by the order determination unit 3 of the corresponding sound encoder.

When the gain can be calculated as an intermediate variable prior to the processing done by the order determination unit 15 within the decoding unit 16, it is possible to omit the decoding of the gain code 19 in the order determination unit 15 by delivering the gain from the decoding unit 16 to the order determination unit 15. The demultiplexing unit 14 demultiplexes the multiplexed code 18 into the main codes included in the multiplexed code 18, i.e., the LSP code 21, the adaptive sound source code 22, and the driving sound source code 23 in the order 20 applied thereto from the order determination unit 15.

The decoding unit 16 decodes the adaptive sound source code 22 so as to produce the adaptive sound source, decodes the driving sound source code 23 so as to produce the driving sound source, decodes the gain code 19 so as to produce respective gains for the adaptive sound source and the driving sound source, and reproduces the sound source by multiplying the adaptive sound source and the driving sound source by the respective gains and by summing the results. The decoding unit 16 then decodes the LSP code 21 so as to produce the LSP, converts this LSP into linear prediction coefficients, acquires a sound signal 17 by furnishing the sound source to a synthetic filter in which the linear prediction coefficients are set as filter coefficients, and outputs this sound signal 17.

Figure 3A:
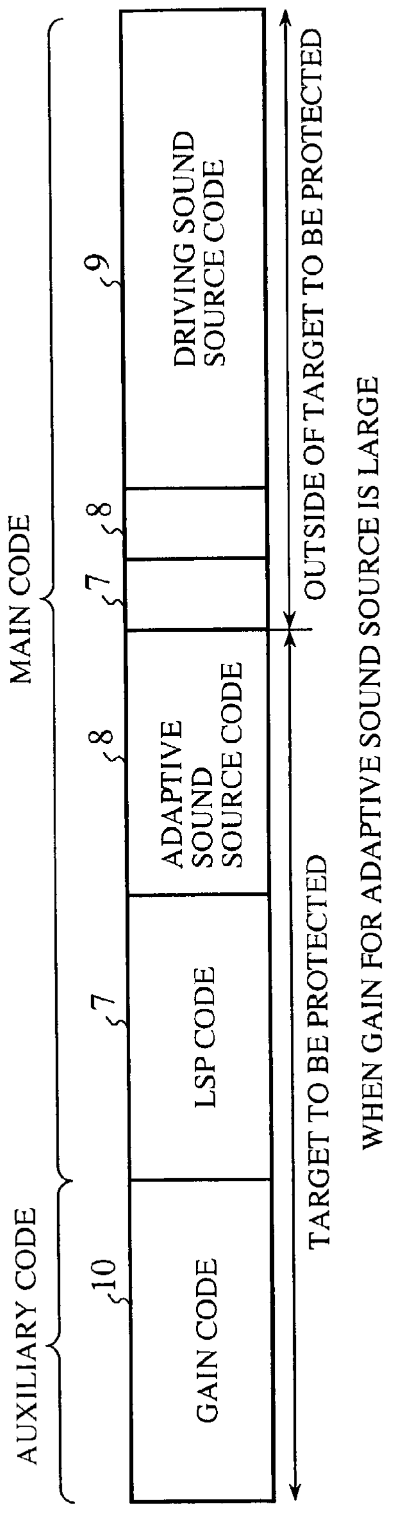
FIGS. 3A and 3B are diagrams showing the structure of a multiplexed code handled by each of the sound encoder and the sound decoder according to the first embodiment of the present invention.
Figure 3B:
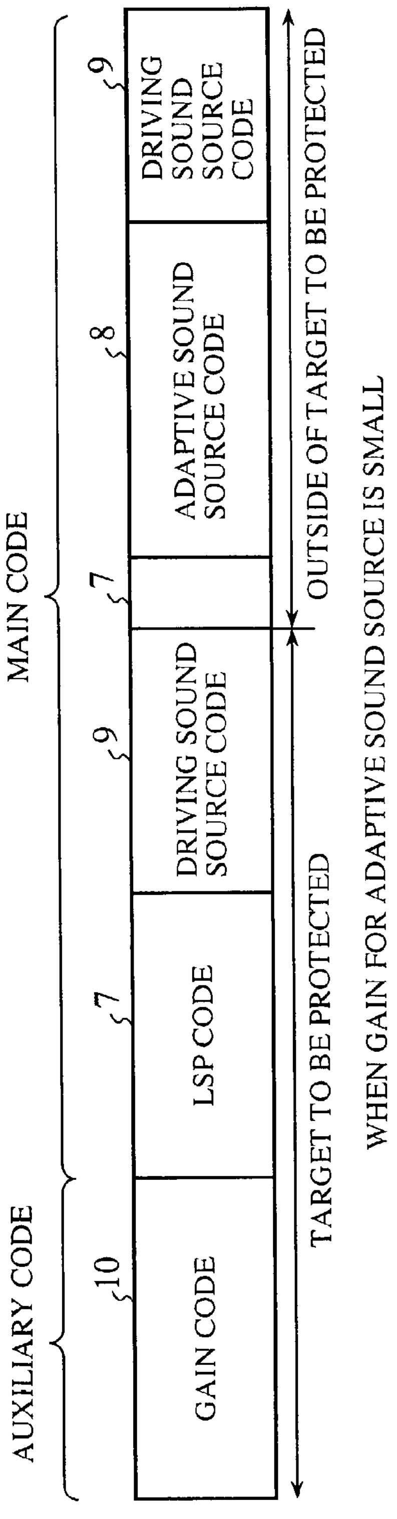

FIGS. 3A and 3B are diagrams showing the structures of the multiplexed codes 12 and 18 respectively handled by the sound encoder and the sound decoder according to the first embodiment of the present invention. Each of the order determination units 3 and 15 determines the order so that the multiplexed code is the one as illustrated in FIG. 3A when the gain acquired for the adaptive sound source is equal to or greater than a predetermined threshold, and the multiplexed code is the one as illustrated in shown in FIG. 3B otherwise.

Because the influence of bit errors that occur in the adaptive sound source code 8 on the sound signal is large when the gain acquired for the adaptive sound source is large, the order, as shown in FIG. 3A, in which the adaptive sound source code 8 has priority over the driving sound source code so that the adaptive sound source code 8 is partially placed in the target region to be protected is selected, and, as a result, all the driving sound source code 9 is placed outside the target region to be protected. In contrast, because the influence of bit errors that occur in the adaptive sound source code 8 on the sound signal is small when the gain acquired for the adaptive sound source is small, the order, as shown in FIG. 3B, in which all the adaptive sound source code 8 is placed outside the target region to be protected is selected, and, as a result, the driving sound source code 9 is partially placed in the target region to be protected. Thus all or part of the code with a large influence of bit errors can be protected with priority on a frame-by-frame basis according to the value of the gain acquired for the adaptive sound source on a frame-by-frame basis.

As shown in FIGS. 3A and 3B, the gain code 10 which is an auxiliary code is placed in a fixed location within the multiplexed code and all the gain code 10 is placed in the target region to be protected. When a bit error, which cannot be corrected, occurs in the auxiliary code, the order 11 output from the order determination unit 3 does not match the order 20 output from the order determination unit 15 and therefore the demultiplexing unit 14 does not correctly demultiplex the multiplexed code into a plurality of codes. To avoid this problem, the auxiliary code is all placed in the target region to be protected.

In accordance with the first embodiment, only the gain code is defined as an auxiliary code to determine the order in which the plurality of codes produced by the encoding unit are to be multiplexed into a multiplexed code. However, the present embodiment is not limited to this method of determining the order. In a variant, only a part of the LSP code is defined as an auxiliary code to determine the order in which the plurality of codes are to be multiplexed into the multiplexed code. In another variant, both the gain code and the LSP code are defined as auxiliary codes to determine the order in which the plurality of codes are to be multiplexed into the multiplexed code. When a part of the LSP code is defined as an auxiliary code, the sound encoder decodes this part of the LSP code so as to determine whether the sound signal has a voice feature and determines the order so as to protect the adaptive sound source code 8 with priority, as in the case of FIG. 3 A, when the sound signal has a voice feature, and to protect the driving sound source code 9 with priority, as in the case of FIG. 3B, when the sound signal does not have any voice feature.

Most of sound encoders acquire one LSP on a frame-by-frame basis and encode the LSP, and analyze each of a plurality of subframes into which each frame is divided so as to acquire codes on a subframe-by-subframe basis for the adaptive sound source, the driving sound source and the gains. Accordingly, most of sound decoders perform processing associated with the adaptive sound source, the driving sound source, and the gains on a subframe-by-subframe basis. In the first embodiment, for simplicity, the number of subframes included in each frame is assumed to be 1. As an alternative, the number of subframes included in each frame can be 2 or more. In this case, because the values of the gains are determined on a subframe-by-subframe basis, the order determination unit determines the order in which the plurality of codes are to be multiplexed according to the values of all the gains included in each frame.

In accordance with the first embodiment, the sound encoder is provided with: an encoding unit for encoding a plurality of parameters that represent an input sound signal representing a sound, such as a musical sound or a voice, so as to produce a plurality of codes on a frame-by-frame basis; an order determination unit for determining and outputting an order in which the plurality of codes are to be multiplexed into a multiplexed code based on one of the plurality of codes on a frame-by-frame basis; a multiplexing unit for multiplexing the plurality of codes one by one into a multiplexed code in the order determined by the order determination unit, and for outputting the multiplexed code; and an error correction coding unit for producing an error correction code for the multiplexed code and for outputting the multiplexed code with the error correction code added thereto as a sound code on a frame-by-frame basis, and the corresponding sound decoder is provided with: an error correction decoding unit for making an error correction to an input sound code by performing error correction decoding on the sound code based on an error correction code included in the sound code, and for outputting a multiplexed code acquired by removing the error correction code from the error-corrected sound code; an order determination unit for determining an order in which the multiplexed code is to be demultiplexed into a plurality of codes based on the multiplexed code on a frame-by-frame basis, and for outputting the order; a demultiplexing unit for demultiplexing the multiplexed code into a plurality of codes in the order determined by the order determination unit on a frame-by-frame basis, and for outputting the plurality of codes; -and a decoding unit for decoding the plurality of codes into which the multiplexed code is demultiplexed by the demultiplexing unit so as to reproduce and output a sound signal representing a sound, such as a musical sound or a voice, on a frame-by-frame basis. As a result, the present embodiment makes it possible to adaptively protect all or part of a code with a large influence of bit errors, and therefore to implement the error protection which reflects a distribution of bit error sensibilities that varies from frame to frame. Therefore the present embodiment offers an advantage of being able to provide a sound encoder and a sound decoder that have immunity to bit errors more than prior art sound encoders and decoders.

In accordance with the first embodiment, the order determination unit classifies a part of the plurality of codes as an auxiliary code and classifies the remainder of them as main codes, and determines the order in which the plurality of codes are to be multiplexed into a multiplexed code so that the auxiliary code is placed in a fixed location of the multiplexed code and the main codes are arranged in the multiplexed code according to the auxiliary code. As a result, the present embodiment makes it possible to reproduce the order based on the auxiliary code multiplexed into a fixed location of the multiplexed code without having to multiplex and demultiplex information on the order. The present embodiment therefore makes it possible to implement the error protection which reflects a distribution of bit error sensibilities that varies from frame to frame without increasing the volume of information on the sound code. Therefore the present embodiment offers an advantage of being able to provide a sound encoder and a sound decoder that have immunity to bit errors more than prior art sound encoders and decoders.

In accordance with the first embodiment, each of the error correction coding unit and the error correction decoding unit has at least the auxiliary code as a target region to be protected. The present embodiment thus makes it possible to prevent the order from being determined by mistake due to occurrence of bit errors in the auxiliary code. In other words, the present embodiment makes it possible to precisely determine order information necessary to implement the error protection which reflects a distribution of bit error sensibilities that varies from frame to frame. The present embodiment therefore offers an advantage of being able to provide a sound encoder and a sound decoder that have immunity to bit errors more than prior art sound encoders and decoders.

In accordance with the first embodiment, the order determination unit determines whether or not each of the main codes is important based on the auxiliary code, and also determines the order in which the main codes are to be multiplexed into the multiplexed code so that each of main codes which are determined to be important is placed in the target region to be protected. The present embodiment thus makes it possible to protect the selected one or more codes which are determined to be important with priority on a frame-by-frame basis. The present embodiment therefore offers an advantage of being able to provide a sound encoder and a sound decoder that have immunity to bit errors more than prior art sound encoders and decoders.

Embodiment 2

Figure 4A:
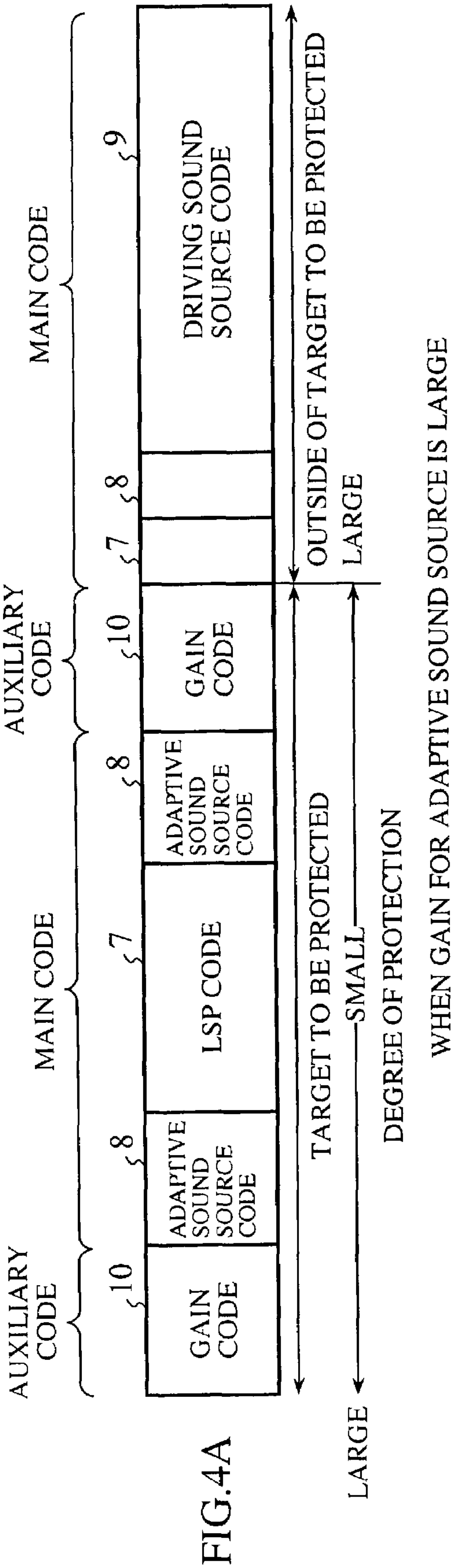
FIGS. 4A and 4B are diagrams showing the structure of a multiplexed code handled by each of a sound encoder and a sound decoder according to a second embodiment of the present invention.
Figure 4B:
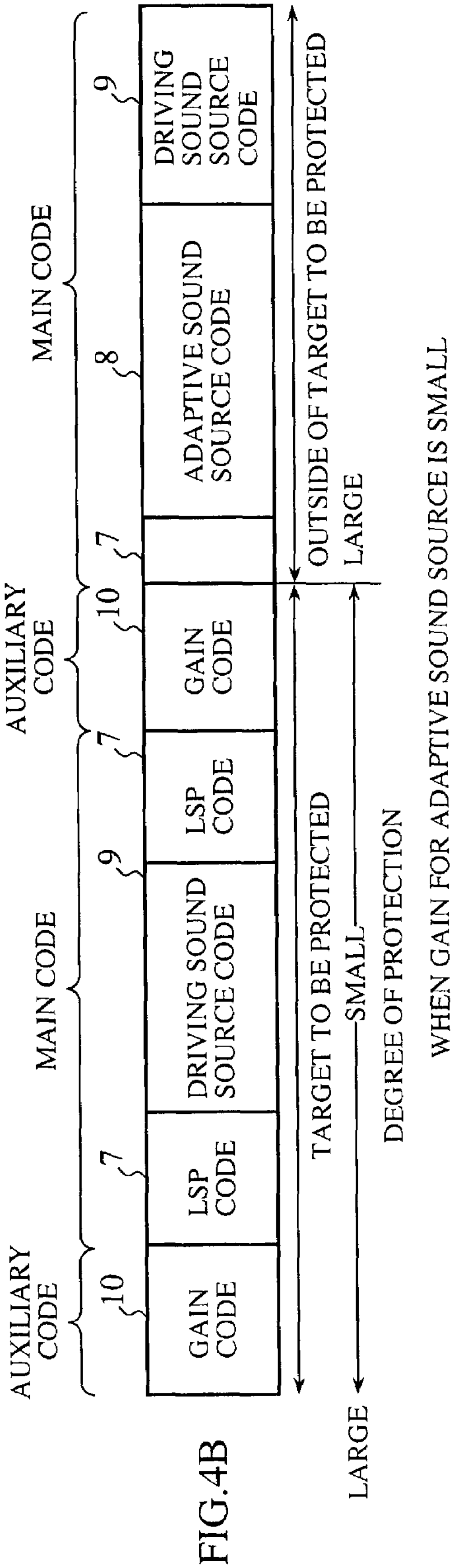

FIGS. 4A and 4B are diagrams showing the structures of multiplexed codes 12 and 18 handled by a sound encoder and a sound decoder according to a second embodiment of the present invention. The sound encoder of the second embodiment has the same structure as that of the first embodiment shown in FIG. 1, with the exception that an order determination unit 3 uses a different method of determining the order in which a plurality of codes are to be multiplexed into a multiplexed code. Similarly, the sound decoder of the second embodiment has the same structure as that of the first embodiment shown in FIG. 2, with the exception that an order determination unit 15 uses a different method of determining the order in which a multiplexed code are to be demultiplexed into a plurality of codes.

Next, the method of determining the order used by each of the order determination units 3 and 15 of the second embodiment with reference to FIGS. 4A and 4B will be explained. Each of the order determination unit 3 and 15 decode a gain code 10 which is an auxiliary code, acquires a gain acquired for an adaptive sound source, determines the order so that the multiplexed code is the one as illustrated in FIG. 4A when the gain acquired for the adaptive sound source is equal to or greater than a predetermined threshold, and the multiplexed code is the one as illustrated in shown in FIG. 4B when the gain acquired for the adaptive sound source is less than the predetermined threshold.

When an error correction coding unit 5 uses a convolutional code as the error correction code, a comparison among bits in the target region to be protected shows that they have a higher degree of error protection as they reach either of both ends of the target region, and have a smaller degree of error protection as they reach the vicinity of the center of the target region. Therefore, immunity to bit errors can be improved by determining the order so that codes with a high bit error sensibility are placed in the vicinity of either of the both ends of the target region to be protected.

In the case where it is apparent from results of examination of average bit error sensitivities of frames having a large gain acquired for the adaptive sound source that part of the adaptive sound source code 8, the gain code 10, part of the LSP code 7, the remainder of the adaptive sound source code 8, the remainder of the LSP code 7, and the driving sound source code 9 have bit error sensitivities which increase in the order named, the order is determined so that the multiplexed code 12 as shown in FIG. 4A is acquired.

In the order as shown in FIG. 4A, the gain code 10 is separately arranged at the both ends of the target region to be protected with high priority because there is a possibility that the order provided in the sound encoder does not match the order provided in the sound decoder when an bit error occurs in the gain code 10 which is an auxiliary code. And, as for the part of the adaptive sound source code 8 and the part of the LSP code 7 among the remaining codes, which can be included in the predetermined target range to be protected, the part of the adaptive sound source code 8 is separately arranged in the vicinity of the both ends of the target region to be protected so that its two separated parts are adjacent to two separated parts of the gain code 10, respectively, and the part of the LSP code 7 is arranged at the center of the target region to be protected, according to their bit error sensibilities. On the other hand, the remaining codes, i.e., the remainder of the LSP code 7, the remainder of the adaptive sound source code 8, and the driving sound source codes 9 which are not the target region to be protected are arranged independently of their bit error sensibility.

In contrast, in the case where it is apparent from results of examination of average bit error sensitivities of frames having a small gain acquired for the adaptive sound source that the gain code 10, part of the LSP code 7, part of the driving sound source code 9, the remainder of the LSP code 7, the remainder of the driving sound source code 9, and the adaptive sound source code 8 have bit error sensitivities which increase in the order named, the order is determined so that the multiplexed code 12 as shown in FIG. 4B is acquired. In this case, the gain code 10 which is an auxiliary code is separately arranged at the same locations as shown FIG. 4A. And, as for the part of the LSP code 7 and the part of the driving sound source code 9 among some remaining codes, which can be included in the predetermined target range to be protected, the part of the LSP code 7 is separately arranged in the vicinity of the both ends of the target region to be protected so that its two separated parts are adjacent to two separated parts of the gain code 10, respectively, and the part of the driving sound source code 9 is arranged at the center of the target region to be protected, according to their bit error sensibilities. On the other hand, the remaining codes, i.e., the remainder of the LSP code 7, the adaptive sound source code 8, and the remainder of the driving sound source code 9 which are not the target region to be protected are arranged independently of their bit error sensibility.

Actually the arrangement becomes more complicated because each bit of each of the plurality of codes has a different bit error sensibility, and explanations about arrangement of bits in each of the plurality of codes are omitted in the above description for the sake of simplicity. In addition, the arrangement can be changed according to the bit error sensibilities of the plurality of codes which increase in an order different from any one of the orders mentioned above.

In accordance with the second embodiment, the order determination unit determines a degree of importance of each of the main codes based on the auxiliary code, and also determines the order in which the main codes are to be multiplexed into the multiplexed code so that the higher degree of importance each of the main codes has the higher degree of protection the error correction coding unit provides, in addition to the structure of the order determination unit of the first embodiment. As a result, in addition to the advantage provided by the first embodiment, the second embodiment offers an advantage of being able to adaptively and strongly protect codes with large bit error sensibilities and hence of considerable importance based on the auxiliary code on a frame-by-frame basis. The present embodiment therefore offers an advantage of being able to provide a sound encoder and a sound decoder that have immunity to bit errors more than prior art sound encoders and decoders.

Embodiment 3

Figure 5A:
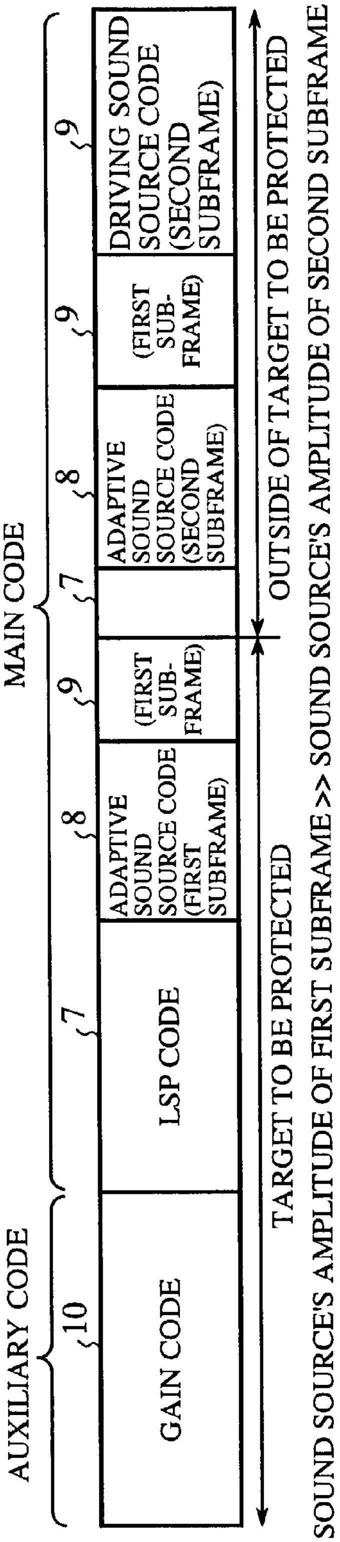
FIGS. 5A, 5B and 5C are diagrams showing the structure of a multiplexed code handled by each of a sound encoder and a sound decoder according to a third embodiment of the present invention.
Figure 5B:
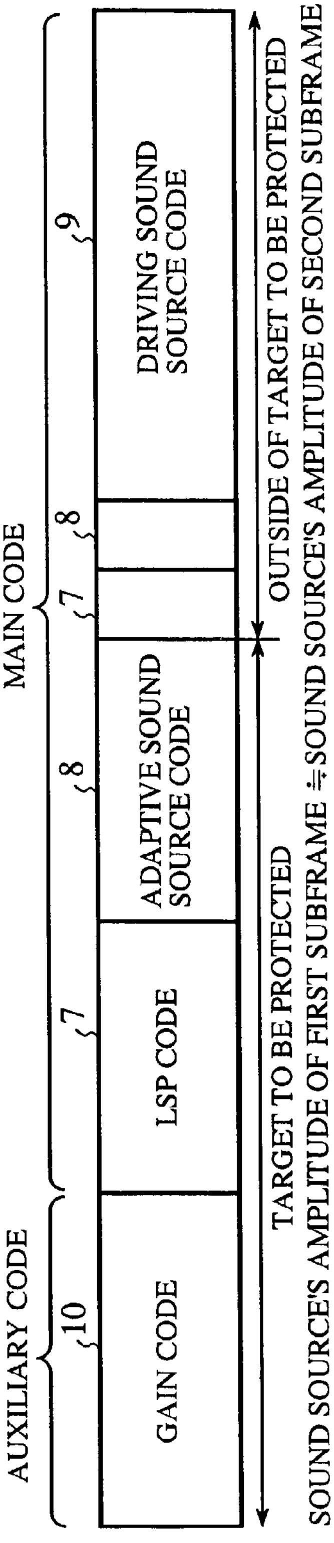
Figure 5C:
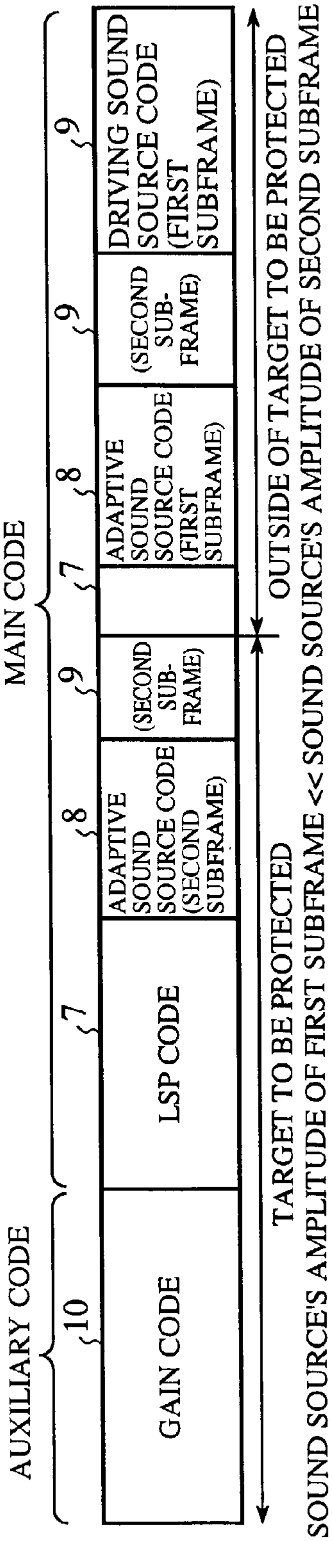

FIGS. 5A, 5B and 5C are diagrams showing the structures of multiplexed codes 12 and 18 handled by a sound encoder and a sound decoder according to a third embodiment of the present invention. The sound encoder of the third embodiment has the same structure as that of the first embodiment shown in FIG. 1, with the exception that the sound encoder encodes an adaptive sound source, a driving sound source and gains for each of two subframes into which each frame is divided and an order determination unit 3 uses a different method of determining the order in which a plurality of codes are to be multiplexed into a multiplexed code. Similarly, the sound decoder of the third embodiment has the same structure as that of the first embodiment shown in FIG. 2, with the exception that the sound decoder decodes the adaptive sound source code, the driving sound source code and the gain code on a subframe-by-subframe basis and an order determination unit 15 uses a different method of determining the order in which a multiplexed code are to be demultiplexed into a plurality of codes.

Next, the method of determining the order used by each of the order determination units 3 and 15 of the third embodiment with reference to FIGS. 5A, 5B and 5C will be explained. Each of the order determination units 3 and 15 decodes the gain code 10 which is an auxiliary code so as to acquire a gain for each subframe and estimates both the sound source's amplitude of a first subframe from the gains acquired for the adaptive sound source and the driving sound source provided for the first subframe and the sound source's amplitude of a second subframe from the gains acquired for the adaptive sound source and the driving sound source provided for the second subframe.

When the estimated sound source's amplitude of the first subframe is sufficiently larger than that of the second subframe, each of the order determination units 3 and 15 determines the order so that the multiplexed code becomes the one in which the codes provided for the first subframe are included in the target region to be protected with priority, as shown in FIG. 5A, because the codes provided for the first subframe are explicitly vulnerable to the influence of errors. In contrast, when the estimated sound source's amplitude of the first subframe is sufficiently smaller than that of the second subframe, each of the order determination units 3 and 15 determines the order so that the multiplexed code becomes the one in which the codes provided for the second subframe are included in the target region to be protected with priority, as shown in FIG. 5C, because the codes provided for the second subframe rather than those provided for the first subframe are explicitly vulnerable to the influence of errors. When neither of the above conditions is satisfied, that is, when neither the estimated sound source's amplitude of the first subframe nor that of the second subframe is sufficiently larger than the other one, each of the order determination units 3 and 15 determines the order so that the multiplexed code becomes the one in which neither of the codes provided for the first and second subframes is included in the target region to be protected with priority, as shown in FIG. 5B.

In the third embodiment, only the gain code is defined as an auxiliary code to determine the order in which the plurality of codes produced by the encoding unit are to be multiplexed into a multiplexed code. However, the present embodiment is not limited to this method of determining the order. In a variant, only a part of the LSP code is defined as an auxiliary code to determine the order in which the plurality of codes are to be multiplexed into a multiplexed code by estimating the sound source's amplitude on a subframe-by-subframe basis. The number of subframes into which each frame is divided is not limited to 2, and it is possible to apply the present embodiment to any case of an increasing number of subframes by providing an increasing number of configurations of the multiplexed code as shown in FIGS. 5A, 5B and 5C.

In according with the third embodiment, it is possible to adaptively protect all or part of a code with a large influence of bit errors, and it is therefore possible to implement the error protection which reflects a distribution of bit error sensibilities that varies from frame to frame. The present embodiment further makes it possible to implement the error protection which reflects a distribution of bit error sensibilities that varies from frame to frame without increasing the volume of information on the sound code, like the sound encoder of the first embodiment. The present embodiment thus makes it possible to prevent the order from being determined by mistake due to occurrence of bit errors in the auxiliary code. In other words, the present embodiment makes it possible to precisely determine order information necessary to implement the error protection which reflects a distribution of bit error sensibilities that varies from frame to frame. The present embodiment therefore offers an advantage of being able to provide a sound encoder and a sound decoder that have immunity to bit errors more than prior art sound encoders and decoders.

Embodiment 4

Figure 6:
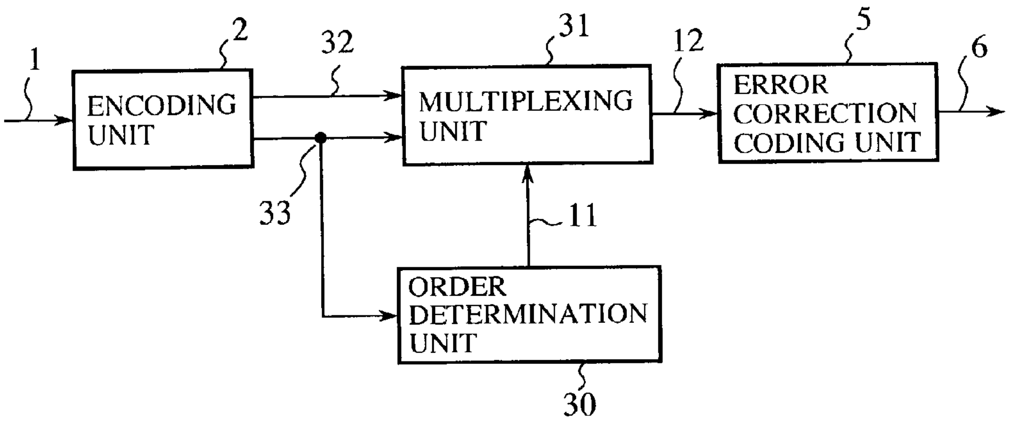
FIG. 6 is a block diagram of a sound encoder according to a fourth embodiment of the present invention.

FIG. 6 is a block diagram showing the structure of a sound encoder according to a fourth embodiment of the present invention. In the figure, reference numeral 1 denotes a sound signal applied to the sound encoder as a target to be coded, reference numeral 2 denotes an encoding unit for encoding the sound signal 1 so as to produce a plurality of codes and for outputting the plurality of codes, reference numerals 32 and 33 denote a band-by-band code and an envelope code encoded by the encoding unit 2, reference numeral 30 denotes an order determination unit for accepting the envelope code 33 so as to determine an order 11 in which the plurality of codes generated by the encoding unit 2 are to be multiplexed into a multiplexed code, reference numeral 31 denotes a multiplexing unit for multiplexing the plurality of codes produced by the encoding unit 2 in the input order 11, reference numeral 12 denotes a multiplexed code into which the plurality of codes generated by the encoding unit are multiplexed by the multiplexing unit 31, reference numeral 5 denotes an error correction coding unit for acquiring an error correction code to be added to the multiplexed code 12, and reference numeral 6 denotes a sound code.

Figure 7:
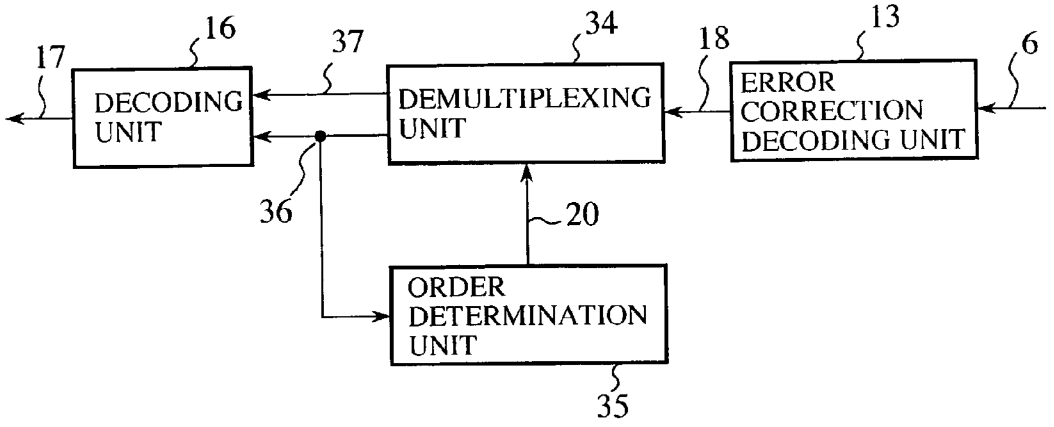
FIG. 7 is a block diagram of a sound decoder according to the fourth embodiment of the present invention.

FIG. 7 is a block diagram showing the structure of a sound decoder according to the fourth embodiment of the present invention. In the figure, reference numeral 13 denotes an error correction decoding unit for making an error correction to the sound code 6 applied thereto using the error correction code included in the sound code 6, and for outputting the error-corrected sound code except the error correction code as a multiplexed code 18, reference numeral 34 denotes a demultiplexing unit for demultiplexing the multiplexed code 18 into a plurality of codes in an input order 20 in which they are to be demultiplexed, reference numeral 37 denotes a band-by-band code which is separated by the demultiplexing unit 34 from the multiplexed code 18, reference numeral 36 is an envelope code into which is separated by the demultiplexing unit 34 from the multiplexed code 18, reference numeral 35 denotes an order determination unit for accepting the envelope code 36 and for determining the order 20 in which the multiplexed code 18 is to be demultiplexed by the demultiplexing unit 14 into a plurality of codes, and reference numeral 16 denotes -a decoding unit for decoding the plurality of codes so as to reproduce a sound signal 17.

Hereafter, the operations of the sound encoder and the sound decoder of the first embodiment will be explained with reference to FIGS. 6 and 7. In the sound encoder, the encoding processing is performed on a frame-by-frame basis, by assuming that each frame of the input sound signal has a predetermined length of, for example, 10 ms. First of all, a sound signal 1 is input to the encoding unit 2. The encoding unit 2 performs time-frequency conversion on the sound signal 1 so as to acquire a frequency domain coefficient and divides this frequency domain coefficient into coefficients for a plurality of bands. The encoding unit 2 then obtains a mean value of each of the frequency domain coefficients acquired for the plurality of bands, encodes an envelope vector which consists of a plurality of obtained mean values, and outputs the coded envelope vector as an envelope code 33. The encoding unit 2 further normalizes the frequency domain coefficient for each band with a value obtained by decoding the envelope code 33, encodes the normalized frequency domain coefficient for each band, and outputs the coded result as a band-by-band code 32.

The order determination unit 30 classifies the envelope code 33 as an auxiliary code and also classifies the band-by-band codes 32 as main codes. The order determination unit 30 accepts the envelope code 33 which is an auxiliary code, decodes this envelope code 33 so as to determine the order 11 in which a plurality of codes produced by the encoding unit are to be multiplexed by the multiplexing unit 31 based on the acquired envelope vector, and outputs the determined order 11.

While the order in which the auxiliary code is to be multiplexed into the multiplexed code does not vary from frame to frame, the order in which the main codes are to be multiplexed into the multiplexed code is determined on a frame-by-frame basis. For example, the order is determined according to the values of elements of the envelope vector acquired by decoding the envelope code 33. Because the envelope vector is calculated as an intermediate variable in the encoding unit 2, the decoding of the envelope code 33 can be omitted in the order determination unit 30 by delivering the envelope vector from the encoding unit 2 to the order determination unit 30.

The multiplexing unit 31 accepts the band-by-band code 32, the envelope code 33 and the order 11, multiplexes the band-by-band code 32 and the envelope code 33 into a multiplexed code 12 in the order 11, and outputs the acquired multiplexed code 12. The error correction coding unit 5 defines a predetermined region included in the multiplexed code 12 as a target region to be protected, acquires an error correction code for this target region to be protected, and adds the acquired error correction code to the end of the multiplexed code 12. The error correction coding unit 5 then outputs the acquired code as a sound code 6. Interleave processing can be performed on the sound code 6 immediately before the sound code 6 is output.

Next, the operation of the sound decoder of the fourth embodiment will be explained. The error correction decoding unit 13 demultiplexes the received sound code 6 into a multiplexed code and an error correction code by defining a predetermined position of the sound code 6 as a boundary of them, so that part of the sound code 6 prior to the predetermined position is the multiplexed code and the remainder of the sound code 6 posterior to the predetermined position is the error correction code. The error correction decoding unit 13 then makes an error correction using the error correction code by defining a predetermined region included in the multiplexed code as a target region to be protected, and outputs the error-corrected multiplexed code 18. When the error correction coding unit 5 of the sound encoder has performed interleave processing, the error correction decoding unit 13 has to perform deinterleave processing which is the reverse of the interleave processing on the sound code 6 first.

The demultiplexing unit 34 first separates only the auxiliary code included in the multiplexed code 18, i.e., only the envelope code 36 and outputs this envelope code 36. In the order determination unit 30 of the sound encoder, the demultiplexing unit 34 can demultiplex only the auxiliary code without having to wait for inputting of the order determined on a frame-by-frame basis because the order in which the auxiliary code is multiplexed into the received multiplexed code is fixed. The order determination unit 35 accepts and decodes the envelope code 36 which is an auxiliary code, determines the order 20 in which the main codes included in the multiplexed are to be demultiplexed by the demultiplexing unit 34 according to a decoded result of the envelope code 36, and then outputs the order 20. The method of determining the order has to be made to be the same as that determined by the order determination unit 30 of the sound encoder.

When the envelope vector can be calculated as an intermediate variable prior to the processing done by the order determination unit 35 in the decoding unit 16, it is possible to omit the decoding of the envelope vector 36 in the order determination unit 35 by delivering the envelope vector from the decoding unit 16 to the order determination unit 35. The demultiplexing unit 34 then separates the main codes included in the multiplexed code 18, i.e., the band-by-band codes 37 in the order 20 input from the order determination unit 35 and outputs the band-by-band codes 37.

The decoding unit 16 decodes the envelope code 36 so as to calculate the envelope vector, decodes the band-by-band codes 37 so as to calculate normalized frequency domain coefficients for a plurality of bands, multiplies the value of each element of the envelope vector for each band by the normalized frequency domain coefficient for each band so as to denormalize the normalized frequency domain coefficients, and performs frequency-time conversion on the denormalized frequency domain coefficients so as to reproduce a sound signal 17.

Figure 8:
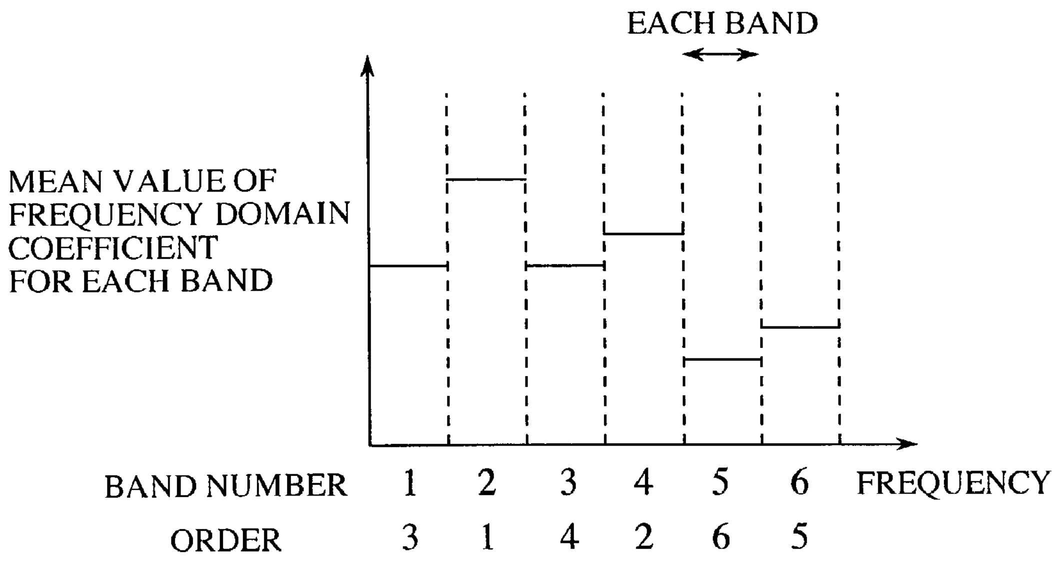
FIG. 8 is a diagram for explaining a method of determining the order in which codes are multiplexed by an order determination unit in each of the sound encoder and the sound decoder according to the fourth embodiment of the present invention.

FIG. 8 is a diagram for explaining a method of determining the order used by the order determination units 30 and 35 in both the sound encoder and the sound decoder according to the fourth embodiment of the present invention. In the figure, the horizontal axis shows a frequency and the vertical axis shows a mean value of the frequency domain coefficient for each band. The total frequency band of the sound signal which is the target to be coded is divided into 6 regions, and these six regions starting from the lowest-frequency region are consecutively numbered with numbers in ascending order. The envelope vector becomes a six-dimensional vector having mean values of the frequency domain coefficients for the six frequency bands as six elements of the vector, and an envelope code is obtained as a result of encoding the envelope vector through vector quantization or the like. For a frame in which the envelope vector into which the envelope code is decoded by the order determination unit becomes the one as shown in FIG. 8, a comparison is made among the values of the elements of the envelope vector, and the first turn is given to a band numbered 2 and having the largest value and the second turn is given to a band numbered 4 and having the second largest value. In the same way, the order in which the band-by-band codes for all the frequency bands are to be multiplexed is determined as shown in FIG. 8 according to the mean values of the six elements of the envelope vector.

Figure 9:
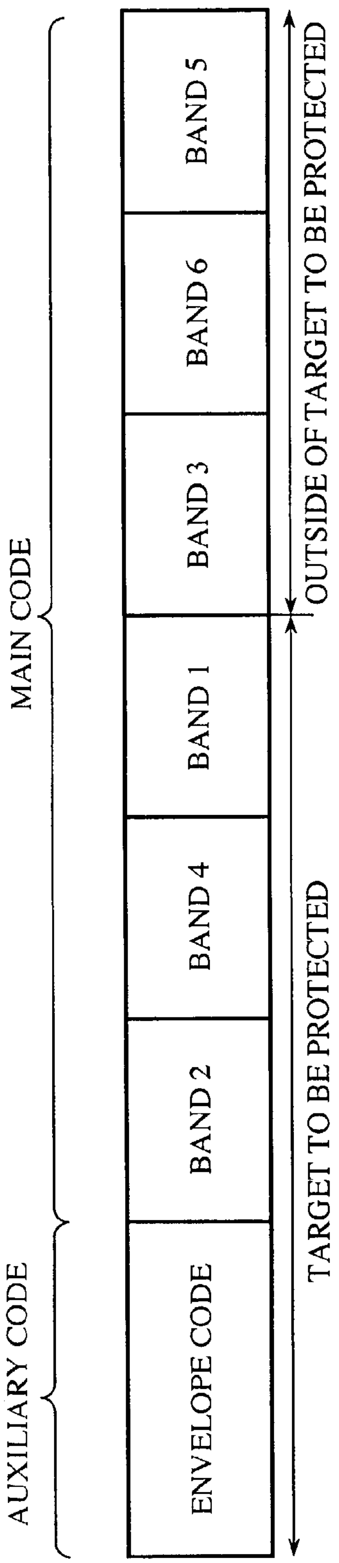
FIG. 9 is a diagram showing the structure of a multiplexed code handled by each of the sound encoder and the sound decoder according to the fourth embodiment of the present invention.
Figure 15:
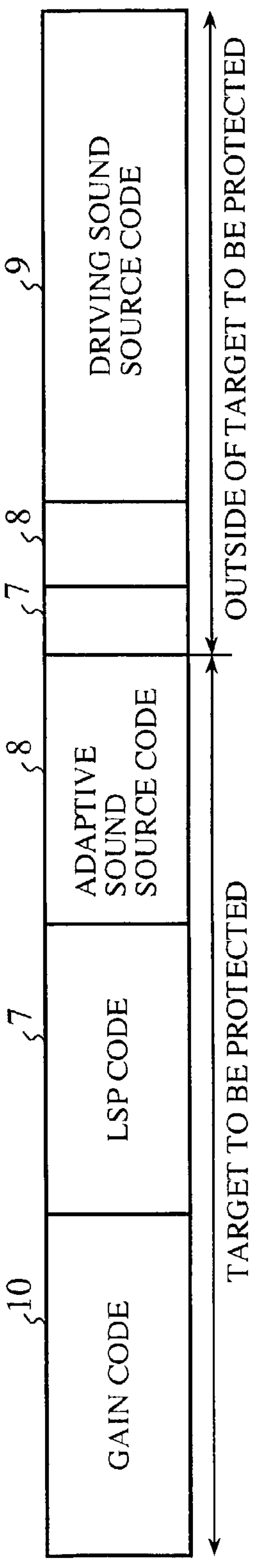
FIG.15(PRIOR ART)
FIG. 15 is a diagram showing the structure of a multiplexed code handled by each of the prior art sound encoder and the prior art sound decoder.

FIG. 9 is a diagram showing the structure of a multiplexed code 18 or 19 handled by each of the sound encoder and the sound decoder according to the fourth embodiment of the present invention. The multiplexed code is the one associated with a frame having an envelope vector as shown in FIG. 8. The envelope code which is an auxiliary code is multiplexed into the head of the multiplexed code, and the band-by-band codes are then multiplexed one by one into the multiplexed code in the order shown in FIG. 8. In other words, one band-by-band code for the band numbered 2 to which the first turn is given by the order determination unit is placed in a location next to the envelope code, and another band-by-band code for the band numbered 4 to which the second turn is given by the order determination unit is placed in a location next to the band-by-band code for the band numbered 2. In the same way, other band-by-band codes for the other bands to which the third and later turns are given by the order determination unit, respectively, are placed in locations next to the band-by-band code for the band numbered 4. A region of a predetermined length, starting from the head of the multiplexed code, is defined as the target region to be protected by using the error correction code, and the three band-by-band codes acquired for the bands numbered 2, 4 and 1 and associated with elements of the envelope vector having a larger value are placed in the target region to be protected and the remaining band-by-band codes acquired for the bands numbered 3, 6 and 5 are placed outside the target region'to be protected.

In accordance with the fourth embodiment, the sound encoder performs time-frequency conversion on an input sound signal representing a sound, such as a musical sound or a voice, on a frame-by-frame basis so as to acquire a frequency domain coefficient, divides this frequency domain coefficient into coefficients for a plurality of bands, calculates a mean value of each of the frequency domain coefficients acquired for the plurality of bands, encodes an envelope vector which consists of a plurality of obtained mean values so as to produce an envelop code, normalizes the frequency domain coefficient obtained for each band with a value obtained by decoding the envelope code, encodes the normalized frequency domain coefficient for each band, outputs the coded result as a band-by-band code for each band, determines the order in which the plurality of codes are to be multiplexed based on the envelope code, multiplexes the band-by-band codes obtained for the plurality of bands and the envelope code, acquires an error correction code for the multiplexed code, and outputs the multiplexed code to which the acquired error correction code is added as a sound code. The sound decoder performs error correction decoding based on the error correction code included in each frame of the input sound code on a frame-by-frame basis, separates the envelope code from the multiplexed code of each frame which is included in the error corrected sound signal and from which the error correction code is removed, determines the order in which the multiplexed code of each frame is to be demultiplexed into a plurality of codes according to the envelope code, demultiplexes the multiplexed code of each frame into a plurality of codes one by one in the determined order, decodes them, acquires a sound signal indicating musical sound or voice on a frame-by-frame basis, and outputs a series of sound signals. As a result, the present embodiment makes it possible to adaptively protect all or part of a code acquired by encoding a large element of the envelope vector, which makes a significant contribution to the decoding and hence has a large influence of bit errors, and therefore to implement the error protection which reflects a distribution of bit error sensibilities that varies from frame to frame. The present embodiment therefore offers an advantage of being able to provide a sound encoder and a sound decoder that have immunity to bit errors more than prior art sound encoders and decoders.

In accordance with the fourth embodiment, the order determination unit classifies a part of the plurality of codes as an auxiliary code and classifies the remainder of them as main codes, and determines the order in which the plurality of codes are to be multiplexed into a multiplexed code so that the auxiliary code is placed in a fixed location of the multiplexed code and the main codes are arranged-in the multiplexed code according to the auxiliary code. As a result, the present embodiment makes it possible to reproduce the order based on the auxiliary code multiplexed into a fixed location of the multiplexed code without having to multiplex and demultiplex information on the order. The present embodiment therefore makes it possible to implement the error protection which reflects a distribution of bit error sensibilities that varies from frame to frame without increasing the volume of information on the sound code. The present embodiment offers an advantage of being able to provide a sound encoder and a sound decoder that have immunity to bit errors more than prior art sound encoders and decoders.

In accordance with the fourth embodiment, each of the error correction coding unit and the error correction decoding unit has at least the auxiliary code as a target region to be protected. The present embodiment thus makes it possible to prevent the order from being determined by mistake due to occurrence of bit errors in the auxiliary code. In other words, the present embodiment makes it possible to precisely determine order information necessary to implement the error protection which reflects a distribution of bit error sensibilities that varies from frame to frame. The present embodiment therefore offers an advantage of being able to provide a sound encoder and a sound decoder that have immunity to bit errors more than prior art sound encoders and decoders.

In accordance with the fourth embodiment, the order determination unit determines whether or not each of the main codes is important based on the auxiliary code, and also determines the order in which the main codes are to be multiplexed into the multiplexed code or the multiplexed code is to be demultiplexed into the main codes so that each of main codes which are determined to be important is placed in the target region to be protected in the error correction coding unit or the error correction-decoding unit. The fourth embodiment thus makes it possible to protect the selected one or more codes which are determined to be important with priority on a frame-by-frame basis. The present embodiment therefore offers an advantage of being able to provide a sound encoder and a sound decoder that have immunity to bit errors more than prior art sound encoders and decoders.

Embodiment 5

Figure 10:
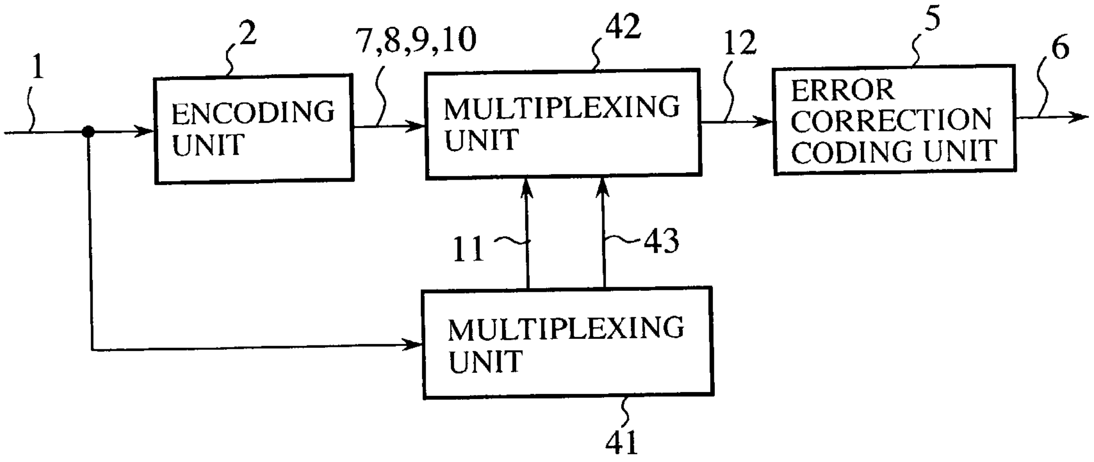
FIG. 10 is a block diagram of a sound encoder according to a fifth embodiment of the present invention.

FIG. 10 is a block diagram showing the structure of a sound encoder according to a fifth embodiment of the present invention. In the figure, reference numeral 1 denotes a sound signal input to the sound encoder as a target to be coded, reference numeral 2 denotes an encoding unit for encoding the sound signal 1 so as to produce a plurality of codes and for outputting them, reference numerals 7, 8, 9 and 10 denote an LSP code, an adaptive sound source code, a driving sound source code, and a gain code, respectively, into which the sound signal 1 is encoded by the encoding unit 2, reference numeral 41 denotes an order determination unit for providing two or more sets of order in which the plurality of codes produced by the encoding unit 2 are to be multiplexed into a multiplexed code in advance, for accepting the sound signal 1, selecting one set of order 11 from the plurality of sets of order, and outputting the selected order 11, and for outputting a multiplexing mode code 43 into which the number of the selected set of order is encoded, reference numeral 42 denotes a -multiplexing unit for multiplexing the multiplexing mode code 43, the LSP code 7, the adaptive sound source code 8, the driving sound source code 9, and the gain code 10 in the order 11 selected by the order determination unit, reference numeral 12 denotes a multiplexed code into which the plurality of codes 7 to 10 and 43 are multiplexed by the multiplexing unit 42, reference numeral 5 denotes an error correction coding unit for acquiring an error correction code for the multiplexed code 12 and for adding it to the multiplexed code 12, and reference numeral 6 denotes a sound code.

Figure 11:
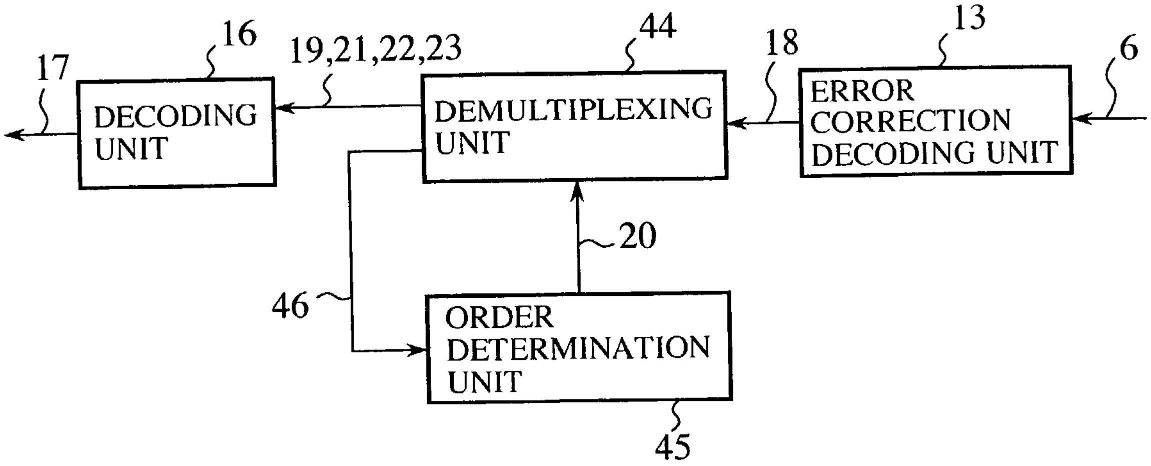
FIG. 11 is a block diagram of a sound decoder according to the fifth embodiment of the present invention.

FIG. 11 is a block diagram showing the structure of a sound decoder according to the fifth embodiment of the present invention. In the figure, reference numeral 13 denotes an error correction decoding unit for making an error correction to the sound code 6 applied thereto using the error correction code included in the sound code 6, and for outputting the error-corrected sound code except the error correction code as a multiplexed code 18, reference numeral 44 denotes a demultiplexing unit for demultiplexing the multiplexed code 18 into a plurality of codes in an input order in which they are to be demultiplexed, reference numerals 21, 22, 23 and 19 denote an LSP code, an adaptive sound source code, a driving sound source code, and a gain code into which the multiplexed code 18 is demultiplexed by the demultiplexing unit 44, respectively, reference numeral 45 denotes an order determination unit for determining the order in which the multiplexed code 18 is to be demultiplexed into the plurality of codes based on a multiplexing mode code 46 similarly separated from the multiplexed code 18 by the demultiplexing unit 44, and reference numeral 16 denotes a decoding unit for decoding the LSP code 21, the adaptive sound source code 22, the driving sound source code 23, and the gain code 19 so as to reproduce a sound signal 17.

Hereafter, the operations of the sound encoder and the sound decoder of the first embodiment will be explained with reference to FIGS. 1 and 2. In the sound encoder, the encoding processing is performed on a frame-by-frame basis, by assuming that each frame of the input sound signal has a predetermined length of, for example, 10 ms. First of all, a sound signal 1 is input to the encoding unit 2. The encoding unit 2 performs a linear prediction analysis on the sound signal 1 to produce linear prediction coefficients and then converts these linear prediction coefficients into LSP (Line Spectral Pairs) so as to output an LSP code 7 produced by encoding the LSP. The encoding unit 2 produces an adaptive sound source code 8 by encoding an adaptive sound source which corresponds to a pitch-scaled periodic component of a sound source, produces a driving sound source code 9 by encoding a driving sound source which corresponds to a remaining component which is the remainder of the sound source other than the adaptive sound source component, and produces a gain code 10 by encoding gains which provide respective amplitudes for the adaptive sound source and the driving sound source, and then outputs these codes to the multiplexing unit 42.

The order determination unit 41 provides two or more sets of order in which the plurality of codes produced by the encoding unit 2 are to be multiplexed into a multiplexed code 12 in advance, and selects one set of order 11 from the plurality of sets of order based on the input sound signal 1. The order determination unit 41 then outputs a multiplexing mode code 43 into which the selected number of the set of order is encoded and the selected order 11. The order 11 does not simply indicate the order in which processes are to be done with time, but indicates where each bit of each of the plurality of codes to be multiplexed into the multiplexed code by the multiplexing unit 42 are to be placed in the multiplexed code.

Hereafter, the multiplexing mode code 43 is classified as an auxiliary code, and the LSP code 7, the adaptive sound source code 8, the driving sound source code 9, and the gain code 10 are classified as main codes. While the order in which the multiplexing mode code 43 which is an auxiliary code is to be multiplexed into the multiplexed code does not vary from frame to frame, the order in which the main codes are to be multiplexed into the multiplexed code is determined on a frame-by-frame basis. The order in which the main codes are multiplexed into the multiplexed code can be determined according to whether or not each frame of the sound code 1 has a high pitch periodicity, for example. It is possible to omit the analysis process in the order determination unit 41 by delivering an intermediate variable calculated in the encoding unit 2 from the encoding unit 2 to the order determination unit 41.

The multiplexing unit 42 accepts the LSP code 7, the adaptive sound source code 8, the driving sound source code 9, the gain code 10, the multiplexing mode code 43, and the order 11, and then multiplexes the LSP code 7, the adaptive sound source code 8, the driving sound source code 9, the gain code 10, and the multiplexing mode code 43 into a multiplexed code 12 in the order 11. The multiplexing unit 4 then outputs the acquired multiplexed code 12. The error correction coding unit 5 defines a predetermined region included in the multiplexed code 12 to be a target region to be protected, acquires an error correction code for this target region to be protected, and adds the acquired error correction code to the end of the multiplexed code 12. The error correction coding unit 5 then outputs the acquired code as a sound code 6. Interleave processing can be performed on the sound code 6 immediately before the sound code 6 is output.

The error correction decoding unit 13 demultiplexes the sound code 6 into a multiplexed code and an error correction code by defining a predetermined position of the sound code 6 to be a boundary of them, so that part of the sound code 6 prior to the predetermined position is the multiplexed code and the remainder of the sound code 6 posterior to the predetermined position is the error correction code. The error correction decoding unit 13 then makes an error correction using the error correction code by defining the predetermined region included in the multiplexed code as the target region to be protected, and outputs the error-corrected multiplexed code 18. When the error correction coding unit 5 of the sound encoder has performed interleave processing, the error correction decoding unit 13 has to perform deinterleave processing, which is the reverse of the interleave processing, on the sound code 6 first.

The demultiplexing unit 44 first separates only the auxiliary code included in the multiplexed code 18, i.e., the multiplexing mode code 46, and outputs this multiplexing mode code 46. In the order determination unit 41 of the sound encoder, the demultiplexing unit 44 can separate only the auxiliary code without having to wait for inputting of the order determined on a frame-by-frame basis because the order in which the auxiliary code is to be multiplexed into the received multiplexed code is fixed. The order determination unit 45 provides two or more of sets of order in which the multiplexed code 18 is to be demultiplexed by the demultiplexing unit 44 in advance, and decodes the input multiplexing mode code 46 so as to acquire the number of the set of order to be selected, reads one order associated with the set number, and outputs the order 20. It should be noted that the prepared two or more sets of order pair with the two or more sets of order provided by the determination unit 41 in the sound encoder.

The demultiplexing unit 44 demultiplexes the multiplexed code 18 into the main codes included in the multiplexed code 18, i.e., the LSP code 21, the adaptive sound source code 22, the driving sound source code 23, and the gain code 19 in the order 20 applied thereto from the order determination unit 45. The decoding unit 16 decodes the adaptive sound source code 22 so as to produce the adaptive sound source, decodes the driving sound source code 23 so as to produce the driving sound source, decodes the gain code 19 so as to produce the respective gains for the adaptive sound source and the driving sound source, and reproduces the sound source by multiplying the adaptive sound source and the driving sound source by the respective gains and by summing the results. The decoding unit 16 then decodes the LSP code 21 so as to produce the LSP, converts this LSP into linear prediction coefficients, acquires a sound signal 17 by furnishing the sound source to a synthetic filter in which the linear prediction coefficients are set as filter coefficients, and outputs this sound signal 17.

Figure 12A:
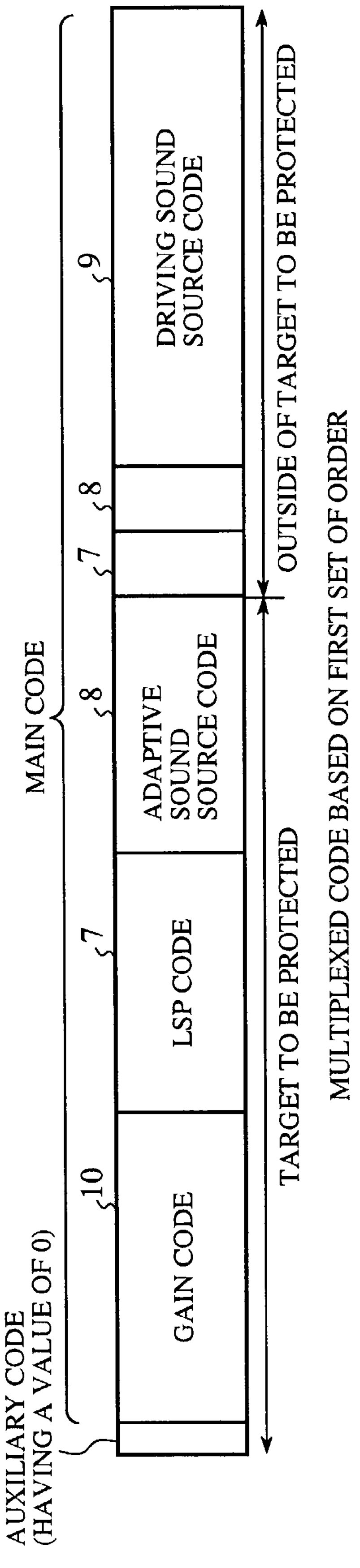
FIGS. 12A and 12B are diagrams showing the structure of a multiplexed code handled by each of the sound encoder and the sound decoder according to the fifth embodiment of the present invention.
Figure 12B:
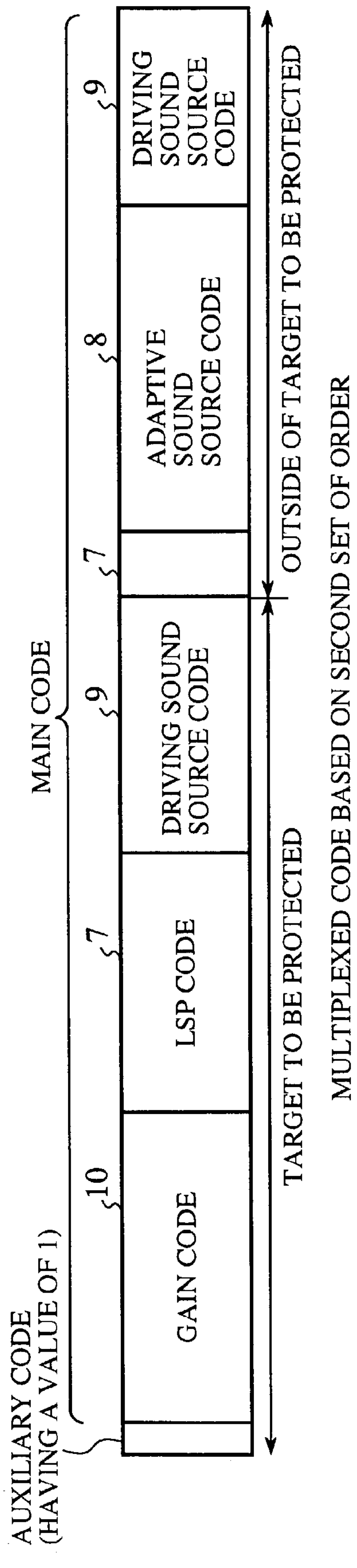
Figure 13:
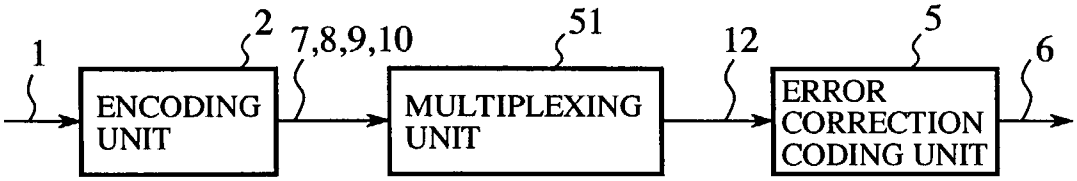
FIG. 13 (PRIOR ART)
FIG. 13 is a block diagram of a prior art sound encoder.
Figure 14:
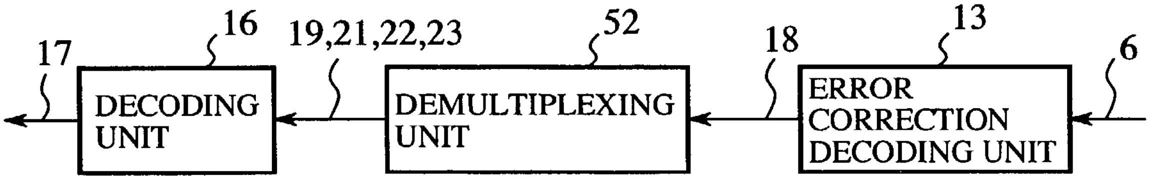
FIG. 14 (PRIOR ART)
FIG. 14 is a block diagram of a prior art sound decoder.

FIGS. 12A and 12B are explanatory diagrams showing the structures of the multiplexed codes-12 and 18 handled by the sound encoder and the sound decoder according to the fifth embodiment of the present invention. In this example, each order determination unit prepares two sets of order for multiplexing or demultiplexing. When the pitch periodicity of the sound signal is high or when the gain acquired for the adaptive sound source calculated by the encoding unit 2 is large, each order determination unit selects the first set of order as shown in FIG. 12A. In this case, the set number and the multiplexing mode code are both set to 0. When the pitch periodicity of the sound signal is high or when the gain acquired for the adaptive sound source calculated by the encoding unit 2 is large, the adaptive sound source code 8 with a high bit error sensibility is placed in the target region to be protected with a higher priority than the driving sound source code 9, in the first set of order shown in FIG. 12A.

In contrast, when the pitch periodicity of the sound signal is low or when the gain calculated for the adaptive sound source by the encoding unit 2 is small, each order determination unit selects the second set of order as shown in FIG. 12B. In this case, the set number and the multiplexing mode code are both set to 1. When the pitch periodicity of the sound signal is low or when the gain calculated for the adaptive sound source by the encoding unit 2 is small, the adaptive sound source code 8 with a high bit error sensibility is placed outside the target region to be protected with a higher priority than the driving sound source code 9, in the second set of order shown in FIG. 12B. The system can thus protect all or part of every code included in the sound signal and susceptible to occurrence of bit errors with priority on a frame-by-frame basis.

As shown in FIGS. 12A and 12B, in-accordance with the fifth embodiment, the multiplexing mode code 43, which is an auxiliary code, is all placed in a fixed location of the target region to be protected. When an bit error, which cannot be corrected, occurs in the auxiliary code, the order 11 output by the order determination unit 41 outputs does not match the order 20 output by the order determination unit 45 and therefore the demultiplexing unit 44 cannot correctly demultiplex the multiplexed code. To avoid this malfunction, the auxiliary code is perfectly placed in the target region to be protected.

In accordance with the present embodiment, the order determination unit in each of the sound encoder and the sound decoder can prepare three or more sets of order for multiplexing or demultiplexing to enable fine settings for the order in which a plurality of codes are to be multiplexed into a multiplexed code or a received multiplexed code is to be demultiplexed into a plurality of codes. The method of determining the order is limited to the one mentioned above.

In accordance with the fifth embodiment of the present invention, the sound encoder is provided with: an encoding unit for encoding a plurality of parameters that represent an input sound signal representing a sound, such as a musical sound or a voice, so as to produce a plurality of codes on a frame-by-frame basis; an order determination unit for providing a plurality of sets of order in which the plurality of codes are to be multiplexed in advance, and for selecting one of the plurality of sets of order based on the sound signal and outputting a multiplexing mode code indicating a number assigned to the selected set of order and the selected set of order on a frame-by-frame basis; a multiplexing unit for defining the multiplexing mode code output from the order determination unit as an auxiliary code and defining the plurality of codes output from the encoding unit to main codes, and for multiplexing the main codes one by one into a multiplexed code in the order determined by the order determination unit, and further multiplexing the auxiliary code into the multiplexed code and outputting the multiplexed code on a frame-by-frame basis; and an error correction coding unit for producing an error correction code for the multiplexed code and for outputting the multiplexed code with the error correction code added thereto as a sound code on a frame-by-frame basis, and the sound decoder is provided with: an error correction decoding unit for making an error correction to an input sound code by performing error correction decoding on the sound code based on an error correction code included in the sound code, and for outputting a multiplexed code acquired by removing the error correction code from the error-corrected sound code; an order determination unit for determining an order in which the multiplexed code is to be demultiplexed into a plurality of codes based on the multiplexed code on a frame-by-frame basis, and for outputting the order; a demultiplexing unit for demultiplexing the multiplexed code into a plurality of codes in the order determined by the order determination unit on a frame-by-frame basis, and for outputting the plurality of codes; and a decoding unit for decoding the plurality of codes into which the multiplexed code is demultiplexed by the demultiplexing unit so as to reproduce and output a sound signal representing a sound, such as a musical sound or a voice, on a frame-by-frame basis. As a result, the present embodiment makes it possible to adaptively protect all or part of a code with a large influence of bit errors and therefore to implement the error protection which reflects a distribution of bit error sensibilities that varies from frame to frame. The present embodiment therefore offers an, advantage of being able to provide a sound encoder and a sound decoder that have immunity to bit errors more than prior art sound encoders and decoders.

In accordance with the fifth embodiment, each of the error correction coding unit and the error correction decoding unit has at least the auxiliary code as a target region to be protected. The present embodiment thus makes it possible to prevent the order from being determined by mistake due to occurrence of bit errors in the auxiliary code. In other words, the present embodiment makes it possible to precisely determine order information necessary to implement the error protection which reflects a distribution of bit error sensibilities that varies from frame to frame. The present embodiment therefore offers an advantage of being able to provide a sound encoder and a sound decoder that have immunity to bit errors more than prior art sound encoders and decoders.

Embodiment 6

In a sound encoder according to a variant of either of the first to fifth embodiments, the order determination unit can interchange a plurality of codes multiplexed into a multiplexed code in a determined order after multiplexing the plurality of codes into the multiplexed code in a fixed order once, instead of multiplexing the plurality of codes into the multiplexed code in the determined order. Even in this case, the same advantages are provided. Similarly, in a sound decoder according to a variant of either of the first to fifth embodiments, the order determination unit can demultiplex an input multiplexed code into a plurality of codes in a fixed order after interchanging the plurality of codes multiplexed into the multiplexed code in a determined order once, instead of demultiplexing the multiplexed code into the plurality of codes in the determined order. Even in this case, the same advantages are provided.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sound encoder comprising:

an encoding means for encoding a plurality of parameters that represent an input sound signal representing a sound so as to produce a plurality of codes on a frame-by-frame basis;

an order determination device that determines and outputs an order in which the plurality of codes are to be multiplexed into a multiplexed code based on one of the produced plurality of codes for each frame on a frame-by-frame basis;

a multiplexing device that multiplexes the plurality of codes one by one into a multiplexed code in the order determined by said order determination means for each frame on a frame-by-frame basis, and that outputs the multiplexed code; and an error correction coding device that produces an error correction code for the multiplexed code and that outputs the multiplexed code with the error correction code added thereto as a sound code on a frame-by-frame basis.

2. The sound encoder according to claim 1, wherein said order determination device classifies a part of the plurality of codes as an auxiliary code and classifies the remainder of the plurality of codes as main codes, and determines the order in which the plurality of codes are to be multiplexed into a multiplexed code so that the auxiliary code is placed in a fixed location of the multiplexed code and the main codes are arranged in the multiplexed code according to the auxiliary code.

3. The sound encoder according to claim 2, wherein said error correction coding device has at least the auxiliary code as a target region to be protected.

4. The sound encoder according to claim 1, wherein the order indicates the time in which each of the plurality of codes are to be multiplexed and also where each bit of each of the plurality of codes is to be placed in the multiplexed code.

5. The sound encoder according to claim 1, wherein each of the produced codes is multiplexed and comprises the plurality of codes.

6. A sound encoder comprising:

an encoding device that encodes a plurality of parameters that represent an input sound signal representing a sound so as to produce a plurality of codes on a frame-by-frame basis;

an order determination device that provides a plurality of sets of order in which the plurality of codes are to be multiplexed in advance, and for selecting one of the plurality of sets of order based on the input sound signal and outputting a multiplexing mode code indicating a number assigned to the selected set of order and the selected set of order on a frame-by-frame basis;

a multiplexing device that defines the multiplexing mode code output from said order determination device as an auxiliary code and defining the plurality of codes output from said encoding device to main codes, and that multiplexes the main codes one by one into a multiplexed code in the order determined by said order determination device, and further multiplexing the auxiliary code into the multiplexed code and outputting the multiplexed code on a frame-by-frame basis; and an error correction coding device that produces an error correction code for the multiplexed code and that outputs the multiplexed code with the error correction code added thereto as a sound code on a frame-by-frame basis.

7. The sound encoder according to claim 6, wherein said error correction coding device has at least the auxiliary code as a target region to be protected.

8. The sound encoder according to claim 7, wherein said order determination device determines whether or not each of the main codes is important based on the auxiliary code, and also determines the order in which the main codes are to be multiplexed into the multiplexed code so that each of main codes which are determined to be important is placed in the target region to be protected.

9. The sound encoder according to claim 7, wherein said order determination device determines a degree of importance of each of the main codes based on the auxiliary code, and also determines the order in which the main codes are to be multiplexed into the multiplexed code so that the higher degree of importance each of the main codes has the higher degree of protection said error correction coding means provides.

10. A sound decoder comprising:

an error correction decoding device that makes an error correction to an input sound code by performing error correction decoding on the sound code based on an error correction code included in the sound code, and for outputting a multiplexed code acquired by removing the error correction code from the error-corrected sound code;

an order determination device that determines an order in which the multiplexed code is to be demultiplexed into a plurality of codes based on the multiplexed code for each frame on a frame-by-frame basis, and that outputs the order;

a demultiplexing device that demultiplexes the multiplexed code into a plurality of codes in the order determined by said order determination device for each frame on a frame-by-frame basis, and for outputting the plurality of codes; and a decoding device that decodes the plurality of codes into which the multiplexed code is demultiplexed by said demultiplexing device so as to reproduce and output a sound signal representing a sound for each frame on a frame-by-frame basis.

11. The sound decoder according to claim 10, wherein said order determination device classifies a part of the plurality of codes as an auxiliary code and classifies the remainder of the plurality of codes as main codes, and determines the order in which the multiplexed code is to be demultiplexed into the plurality of codes so that the auxiliary code is separated from a fixed location of the multiplexed code and the main codes are separated from the multiplexed code according to the auxiliary code.

12. The sound decoder according to claim 11, wherein said error correction decoding device defines at least the auxiliary code as a target region to be protected.

13. A sound decoder comprising:

an error correction decoding device that makes an error correction to an input sound code by performing error correction decoding on the sound code based on an error correction code included in the sound code, and that outputs a multiplexed code acquired by removing the error correction code from the error-corrected sound code;

an order determination device that provides a plurality of sets of order in which the multiplexed code is to be demultiplexed into a plurality of codes, and for selecting and outputting one of the plurality of sets of order according to a multiplexing mode code which is separated from the multiplexed code;

a demultiplexing device that separates the multiplexing mode code as an auxiliary code from the multiplexed code based on the multiplexed code on a frame-by-frame basis, delivering the multiplexing mode code to said order determination device, demultiplexing the multiplexed code into a plurality of codes as main codes one by one in the order output from said order determination device on a frame-by-frame basis, and for outputting the plurality of codes; and a decoding device that decodes the plurality of codes by said demultiplexing device so as to reproduce a sound signal representing a sound on a frame-by-frame basis, and for outputting the sound signal.

14. The sound decoder according to claim 13, wherein said error correction decoding device defines at least the auxiliary code as a target region to be protected.

15. The sound decoder according to claim 14, wherein said order determination device determines whether or not each of the main codes is important based on the auxiliary code, and determines the order in which the multiplexed code is to be demultiplexed into the main codes so that said error correction decoding device can assume that each of one or more main codes which are determined to be important is placed in the target region to be protected.

16. The sound decoder according to claim 14, wherein said order determination device determines a degree of importance of each of the main codes based on the auxiliary code, and determines the order in which the multiplexed code is to be demultiplexed into the main codes so that said error correction decoding device can provide a higher degree of protection for a main code having a higher degree of importance.

* * * * *